(12) United States Patent
Colom Ikuno et al.

(10) Patent No.: US 11,641,694 B2
(45) Date of Patent: May 2, 2023

(54) EMULATION FUNCTIONALITY BETWEEN A FIRST MOBILE COMMUNICATION NETWORK AND A SECOND MOBILE COMMUNICATION NETWORK

(71) Applicant: Deutsche Telekom AG, Bonn (DE)

(72) Inventors: Josep Colom Ikuno, Korneuburg (AT); Reinhard Lauster, St. Poelten (AT)

(73) Assignee: DEUTSCHE TELEKOM AG, Bonn (DE)

( * ) Notice: Subject to any disclaimer, the term of this patent is extended or adjusted under 35 U.S.C. 154(b) by 9 days.

(21) Appl. No.: 17/367,449

(22) Filed: Jul. 5, 2021

(65) Prior Publication Data

US 2022/0015192 A1    Jan. 13, 2022

(30) Foreign Application Priority Data

Jul. 9, 2020 (EP) .................................. 20 185 039

(51) Int. Cl.
*H04W 92/02* (2009.01)
*H04W 24/08* (2009.01)
(Continued)

(52) U.S. Cl.
CPC ........... *H04W 92/02* (2013.01); *H04W 24/08* (2013.01); *H04W 48/18* (2013.01); *H04W 92/16* (2013.01)

(58) Field of Classification Search
CPC ..... H04W 92/02; H04W 92/16; H04W 24/08; H04W 48/18; H04W 16/18; H04L 12/5691; H04L 41/145; H04L 43/00
See application file for complete search history.

(56) References Cited

U.S. PATENT DOCUMENTS 10,084,643 B2 * 9/2018 Zhang .................... H04L 41/12
10,084,657 B2 * 9/2018 Shevenell .............. H04L 41/12
(Continued)

FOREIGN PATENT DOCUMENTS

EP       2152038 A1    2/2010
EP       2209286 A1    7/2010
WO   WO 2015185517 A1   12/2015

OTHER PUBLICATIONS

Gamma E, et al., "Design Patterns, Passage", Design Patterns, Jan. 1, 1995, pp. 139-143, Addison-Wesley Publishing Company, Boston, USA, XP002466111.
(Continued)

*Primary Examiner* — Jenee Holland
(74) *Attorney, Agent, or Firm* — Leydig, Voit & Mayer, Ltd.

(57) ABSTRACT

A method for an emulation functionality between a first mobile communication network and a second mobile communication network includes: implementing, by an emulation function and its first and second interfaces using a respective plurality of emulated network functions or services and emulated network elements, an exchange of messages between the first and second mobile communication networks, thereby mapping between equivalent capabilities or needs of respective network functions or services and respective network elements and providing for: implementation of first individual interfaces or first individual interface types between the network functions or services and respective corresponding emulated network functions or services in the form of application programming interfaces (APIs); and implementation of second individual interfaces or second individual interface types between the network elements and respective corresponding emulated network (Continued)

elements in the form of network standard-specific interfaces or protocols.

10 Claims, 12 Drawing Sheets

(51) Int. Cl.
*H04W 48/18* (2009.01)
*H04W 92/16* (2009.01)
*H04W 16/22* (2009.01)

(56) References Cited

U.S. PATENT DOCUMENTS

| | | | | |
|---|---|---|---|---|
| 11,223,560 | B2* | 1/2022 | Thanneeru | H04L 12/2856 |
| 2016/0328252 | A1* | 11/2016 | Singh | G06F 9/45558 |
| 2017/0279668 | A1* | 9/2017 | Shevenell | H04L 69/40 |
| 2017/0308395 | A1* | 10/2017 | Cook | H04L 67/02 |
| 2017/0308503 | A1* | 10/2017 | Somohano | H04L 45/02 |
| 2018/0035399 | A1* | 2/2018 | Xu | H04W 60/04 |
| 2018/0077024 | A1* | 3/2018 | Zhang | H04L 41/0896 |
| 2018/0184413 | A1* | 6/2018 | Rong | H04W 76/10 |
| 2018/0192337 | A1 | 7/2018 | Ryu et al. | |
| 2018/0248973 | A1* | 8/2018 | Cook | H04L 63/08 |
| 2019/0109768 | A1* | 4/2019 | Senarath | H04W 48/16 |
| 2019/0268213 | A1* | 8/2019 | Zhou | H04L 41/0246 |
| 2019/0379585 | A1* | 12/2019 | Horvat | H04L 41/145 |
| 2019/0387393 | A1* | 12/2019 | Xu | H04W 48/10 |
| 2019/0394655 | A1* | 12/2019 | Rahman | H04L 41/5058 |
| 2020/0036570 | A1* | 1/2020 | Curtis | H04L 41/40 |
| 2020/0059416 | A1* | 2/2020 | Xu | H04W 48/18 |
| 2020/0099568 | A1* | 3/2020 | Baheri | H04L 41/06 |
| 2020/0137160 | A1* | 4/2020 | Gopinath | G06F 9/45558 |
| 2020/0382374 | A1* | 12/2020 | Yi | H04L 41/5048 |
| 2022/0014939 | A1* | 1/2022 | Colom Ikuno | G06F 9/541 |
| 2022/0158903 | A1* | 5/2022 | D'Acunto | H04L 41/12 |
| 2022/0158926 | A1* | 5/2022 | Wennerström | H04L 43/20 |
| 2022/0247678 | A1* | 8/2022 | Atwal | H04W 12/033 |

OTHER PUBLICATIONS

Anonymous, "5G; System architecture for the 5G System (5GS) (3GPP TS 23.501 version 15.5.0 Release 15)", ETSI TS 123 501, Mar. 25, 2019, pp. 1-242, Version 15.5.0, ETSI, Sophia Antipolis, France, XP055745073.

Ghassan A. Abed, et al., "The Evolution to 4G Cellular Systems: Architecture and Key Features of LTE-Advanced Networks", International journal of Computer Networks and Wireless Communications, Dec. 2012, pp. 21-26, vol. 2, No. 1, AIRCC Publishing Corporation, Sydney, Australia, XP055757194.

* cited by examiner

EMULATION FUNCTIONALITY BETWEEN A FIRST MOBILE COMMUNICATION NETWORK AND A SECOND MOBILE COMMUNICATION NETWORK

CROSS-REFERENCE TO PRIOR APPLICATIONS

Priority is claimed to European Patent Application No. EP 20 185 039.3, filed on Jul. 9, 2020, the entire disclosure of which is hereby incorporated by reference herein.

FIELD

The present invention relates a method for an improved emulation and/or interworking functionality between a first mobile communication network and a second mobile communication network, wherein the first mobile communication network is a mobile communication network realizing dynamic deployment or configuration of a plurality of network functions or services such that the plurality of network functions or services composing this network discover interconnection endpoints by means of which communication with other network functions or services in this network or another network is able to be realized by means of querying a network function registry, and wherein the second mobile communication network is a mobile communication network comprising a plurality of network elements, wherein the plurality of network elements composing the second mobile communication network are configured with interconnection endpoints by means of which communication with other network elements in the second mobile communication network or another network is able to be realized.

Furthermore, the present invention relates to a corresponding system for an improved emulation and/or interworking functionality between a first mobile communication network and a second mobile communication network, the system comprising at least the first or the second mobile communication network, and an emulation function.

Additionally, the present invention relates to a corresponding emulation function for such mobile communication networks and/or such a system.

Furthermore, the present invention relates to a program, and a computer program product for an improved emulation and/or interworking functionality between a first and second mobile communication network.

BACKGROUND

Conventionally, mobile communication networks are operated according to different technologies or also radio access technologies. Examples thereof include mobile communication networks according to the so-called third generation standard of mobile communication networks, or according to the so-called fourth generation standard of mobile communication networks (sometimes also called LTE for long term evolution), or, now emerging, according to the fifth generation standard of mobile communication networks (5G networks or 5G system).

In order for mobile communication networks according to different communication standards or according to different generations of mobile communication network standards to be able to cooperate and to provide communication services to different user equipments (i.e. for example user equipments being related to or having as their home mobile communication network, e.g., a 4G mobile communication network, other user equipments being related to or having as their home mobile communication network, e.g., a 5G mobile communication network and the need to enable such different users to roam on different networks where the visited network may not have the same capabilities or be of the same type as the home network), there is a need for a solution providing the possibility to enable an improved emulation and/or interworking functionality between different mobile communication networks.

SUMMARY

In an exemplary embodiment, the present invention provides a method for an emulation and/or interworking functionality between a first mobile communication network and a second mobile communication network. The first mobile communication network is a mobile communication network realizing dynamic deployment or configuration of a plurality of network functions or services such that the plurality of network functions or services composing this network discover interconnection endpoints via which communication with other network functions or services in this network or another network is able to be realized via querying a network function registry. The second mobile communication network is a mobile communication network comprising a plurality of network elements, wherein the plurality of network elements composing the second mobile communication network are configured with interconnection endpoints via which communication with other network elements in the second mobile communication network or another network is able to be realized. The emulation and/or interworking functionality is realized via providing an emulation function comprising a first interface towards the first mobile communication network and a second interface towards the second mobile communication network. The first interface comprises a plurality of emulated network functions or services corresponding to and/or interacting with the plurality of network functions or services. The second interface comprises a plurality of emulated network elements corresponding to and/or interacting with the plurality of network elements. The method comprises: implementing, by the emulation function and its first and second interfaces using the respective plurality of emulated network functions or services and emulated network elements, an exchange of messages towards and/or from both the first and second mobile communication networks, thereby mapping between equivalent capabilities and/or needs of the respective network functions or services and network elements and providing for: the implementation of first individual interfaces or first individual interface types between network functions or services and the respective corresponding emulated network functions or services in the form of application programming interfaces (APIs); and the implementation of second individual interfaces or second individual interface types between the network elements and the respective corresponding emulated network elements in the form of network standard-specific interfaces or protocols.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become appar- FIGS. 1-2 and 5-7 schematically illustrate a first and second mobile communication network, and an emulation function according to the present invention with different parts thereof represented in different figures in greater detail.

DETAILED DESCRIPTION

Figure 1:
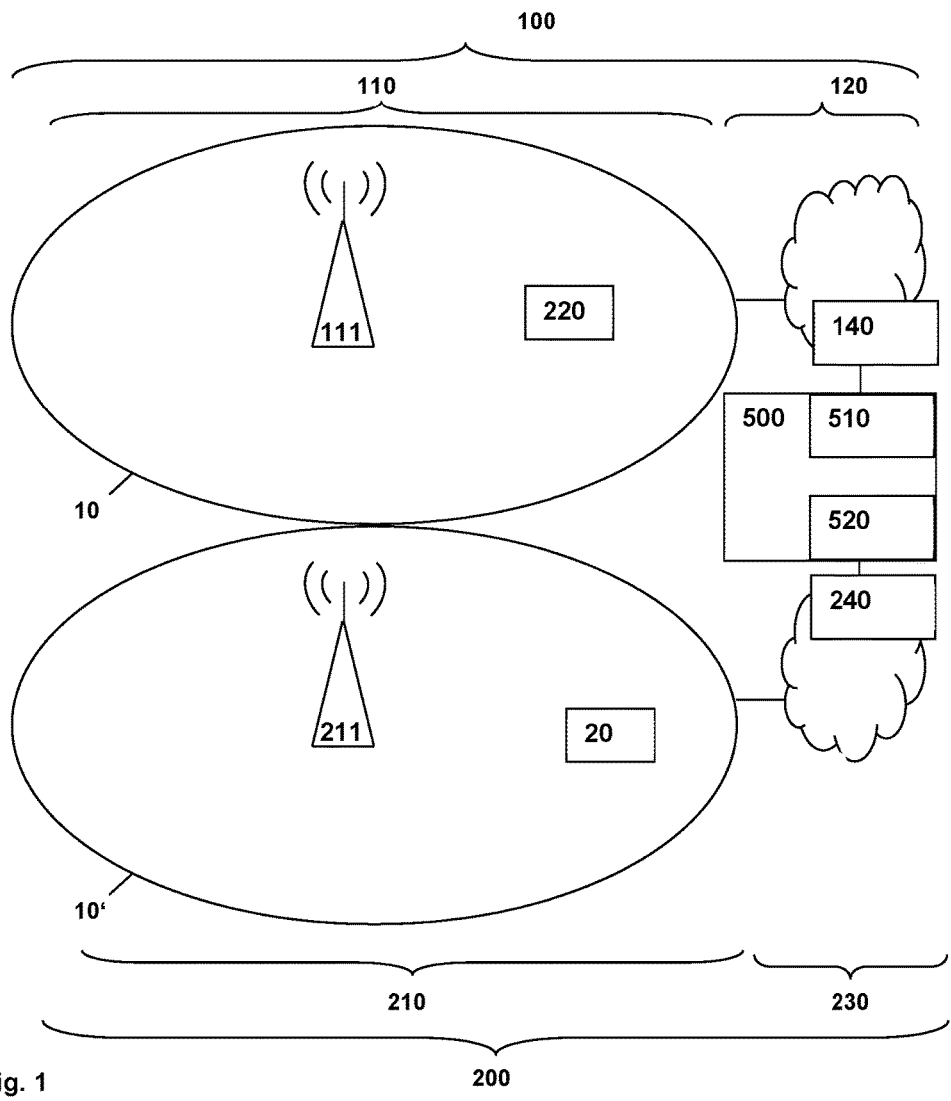

Exemplary embodiments of the present invention provide a technically simple, effective and cost effective solution for an improved emulation and/or interworking functionality between a first mobile communication network and a second mobile communication network of different technologies, especially different radio access technologies. Exemplary embodiments of the present invention further provide a corresponding system and a corresponding emulation function, and a corresponding program and computer program product.

In an exemplary embodiment, the present invention provides a method for an improved emulation and/or interworking functionality between a first mobile communication network and a second mobile communication network, wherein the first mobile communication network is a mobile communication network realizing dynamic deployment or configuration of a plurality of network functions or services such that the plurality of network functions or services composing this network discover interconnection endpoints via which communication with other network functions or services in this network or another network is able to be realized via querying a network function registry, and wherein the second mobile communication network is a mobile communication network comprising a plurality of network elements, wherein the plurality of network elements composing the second mobile communication network are configured with interconnection endpoints via which communication with other network elements in the second mobile communication network or another network is able to be realized, wherein the improved emulation and/or interworking functionality is realized via providing an emulation function comprising a first interface towards the first mobile communication network, and a second interface towards the second mobile communication network, wherein the first interface comprises a plurality of emulated network functions or services corresponding to and/or interacting with the plurality of network functions or services, and wherein the second interface comprises a plurality of emulated network elements corresponding to and/or interacting with the plurality of network elements, wherein the method comprises the following step:

the emulation function and its first and second interfaces—especially using the respective plurality of emulated network functions or services and emulated network elements—implement an exchange of messages towards and/or from both the first and second mobile communication network, thereby especially mapping between equivalent capabilities and/or needs of the respective network functions or services and network elements and providing for the implementation of first individual interfaces or first individual interface types between the network functions or services and the respective corresponding emulated network functions or services, especially in the form of application programming interfaces (APIs), and the implementation of second individual interfaces or second individual interface types between the network elements and the respective corresponding emulated network elements, especially in the form of network standard-specific interfaces or protocols.

It is thereby advantageously possible according to the present invention to provide a solution to allow, e.g., a 5G-only network (e.g. a campus network), or first mobile communication network, to transparently interwork (e.g. for a roaming case or scenario) with a non-5G network (e.g. legacy 4G network), or second mobile communication network, without the need that the 5G-only network (first mobile communication network) is required to support legacy (i.e. non-5G) protocols or procedures.

In an analogous manner, it is likewise possible according to the present invention that, complementary to emulating, e.g., a 5G functionality (of the second mobile communication network, which is a non-5G network) for the first mobile communication network, it is advantageously possible to allow 4G networks (or, more generally, non-5G networks, i.e. the second mobile communication network) to transparently interwork with 5G networks, i.e. with the first mobile communication network, i.e. to emulate, e.g., a 4G functionality (of the first mobile communication network, which is not a 4G network) for the second mobile communication network. Hence, any type of 5G-only networks (e.g. campus networks), even the simplest of all, with no 4G (or non-5G) capabilities implemented at all, are able to interact with legacy networks, especially 4G-only networks, and vice versa. In other words, the method enables a legacy network (e.g. 4G) to be seen as a 5G network, and a 5G network to be seen as a legacy (e.g. 4G) network. This is achieved by a new network emulation function to enable interworking, procedures, parameter mapping and protocols for authentication, mobility- and session management.

As a consequence, according to the present invention, it is advantageously possible that operators are able to consider a 5G-only deployment without fearing that essential roaming scenarios are not working because of limitations on other networks. Hence, e.g. new operators with specific needs (e.g. providing campus networks) need not consider any legacy protocols, resulting in less efforts and, hence, reduced costs, as it is possible, according to the present invention, to provide interconnection to a non-5G-capable network having no 5G roaming available or if the partner network does not have a 5G core network available. Likewise, from a public operator's perspective, switching to 5G-only would—without an exemplary embodiment of the inventive network emulation function—require that all roaming partners support 5G roaming or accepting that some customer will not have service in some countries; if campus networks do require at some point inter-network connectivity, it would also require 5G networks.

The emulation according to the present invention could, e.g., be delegated to another entity (e.g. an IP exchange service) instead of being directly performed by either the 5G network operator, or the legacy network operator; hence, such an IP exchange service is able to be implemented and used to bridge these technology gaps and offer a managed roaming service where 5G networks can be accessed as if they were another (non-5G) technology, and, likewise, non-5G networks can be accessed as if they were 5G technology.

It is advantageously possible according to the present invention:
- to easily provide campus network interconnection services via using the emulation function,
- to provide a future-proof 5G interconnection using 5G roaming agreements without the need to establish 4G and 5G roaming agreements,
- to provide for 5G interconnection with networks which are not offering 5G roaming,
- to be able to provide a new IP exchange service, that is able to be used by network operators as a 5G emulation service and/or a discovery service to provide a secure roaming and interconnection hub functionality,
- that there is no need to deploy and test a 4G-to-5G N26 interface; according to the present invention, a less complex architecture is advantageously possible,
- that only a 5G core network or functionality need to be deployed which would be able to interconnect with another operator's legacy network (non-5G network); roaming would then be taken care of as a managed service by the emulation function (or by an IP exchange network or hosted inside the operator's 4G network).

According to the present invention, the first mobile communication network can reuse for interconnection with the legacy network (second mobile communication network) all business related agreements which applies to other networks (e.g. service level agreements, roaming agreements etc.); it is provided, according to the present invention, an easy, single, future-proof point of configuration and integration so that the first mobile communication network (e.g. a connecting 5G-only network) can discover its counterpart entities from the second mobile communication network (i.e. the other non-5G network or plurality of networks) in similar manner. Especially, according to the present invention, network functions or services within the first mobile communication network, i.e. typically within the 5G network, are automatically notified in a 5G-service-based manner if there is a change of the network elements in the other legacy network entities (i.e. the second mobile communication network, e.g. in case of new instances (or network elements) added, instances (or network elements) removed/changed) to minimize static configuration on the side of the first mobile communication network (typically the 5G side).

Furthermore, according to the present invention, the second mobile communication network (i.e. a non-5G network) is allowed to transparently interwork (e.g. in roaming scenarios) with the first mobile communication network (e.g. a 5G-only network such as a campus network) without the need to support 5G protocols or procedures; hence, an easy single point of configuration and integration is provided such that the connecting non-5G network (second mobile communication network) is able to obtain emulated network element configuration from the emulation function (such as an IP exchange services (IPX) provider); since 5G network function (or service) instances are designed to support dynamical instantiation (new instances register in the network repository function, old ones can be deregistered, registered ones can be updated), the present invention also aims at exposing this capability to the second mobile communication network, i.e. to non-5G networks. If no DNS-based resolution based on GSMA standards is used, this includes automatic notification to OAM or an Element Management System (EMS) of the non-5G network if there is a change of the 5G network functions (or services) (e.g. a new network function instance being added, a network function instance being removed or changed); If DNS-based resolution based on GSMA standards is used, this includes automatic configuration of the DNS resolution if there is a change of the 5G network functions (e.g. a new network function instance added, or network function instances removed or changed). Currently, any mapping between non-5G and 5G networks (second and first mobile communication network) only relies on static configuration, i.e. 5G network functions cannot make use of the network repository function-enabled dynamic 5G core architecture. However, according to the present invention, (despite non-5G networks not having a standardized network repository function feature allowing for automatic discovery of network functions), the method is also applicable to non-5G architectures or networks implementing current GSMA-driven roaming resolution or implementing network element configuration controlled by an OAM (Operations and Maintenance) system.

In the following, the first mobile communication network is typically a 5G-network (or a higher generation (than 5G) mobile communication network), i.e. the first mobile communication network being a mobile communication network realizing dynamic deployment or configuration of a plurality of network functions or services such that the plurality of network functions or services composing this network discover interconnection endpoints via which communication with other network functions or services in this network or another network is able to be realized via querying a network function registry. Additionally, the second mobile communication network is typically a 4G-network (or a lower generation (than 4G) mobile communication network), i.e. the second mobile communication network being a mobile communication network comprising a plurality of network elements, wherein the plurality of network elements composing the second mobile communication network are configured with interconnection endpoints via which communication with other network elements in the second mobile communication network or another network is able to be realized.

According to the present invention, the improved emulation and/or interworking functionality is realized via providing the emulation function, and furthermore according to the present invention, the emulation function comprises a first interface towards the first mobile communication network, and a second interface towards the second mobile communication network, wherein the first interface comprises a plurality of emulated network functions or services corresponding to and/or interacting with the plurality of network functions or services, and wherein the second interface comprises a plurality of emulated network elements corresponding to and/or interacting with the plurality of network elements. An exemplary embodiment of the inventive method comprises the step of the emulation function and its first and second interfaces—especially using the respective plurality of emulated network functions or services and emulated network elements—implementing an exchange of messages towards and/or from both the first and second mobile communication network, thereby especially mapping between equivalent capabilities and/or needs of the respective network functions or services and network elements and providing for
- the implementation of first individual interfaces or first individual interface types between the network functions or services and the respective corresponding emulated network functions or services, especially in the form of application programming interfaces, APIs, and the implementation of second individual interfaces or second individual interface types between the network elements and the respective corresponding emulated network elements, especially in the form of network standard-specific interfaces or protocols.

According to the present invention, it is advantageously possible and preferred that the emulation function provides for a protocol translation, a protocol adaptation, a parameter mapping and a procedure adaptation, thereby especially mapping between equivalent capabilities of the first and second mobile communication networks, wherein especially an internal message procedure state is realized by the emulation function, thereby multiplexing and/or demultiplexing messages towards and/or from both the first and second mobile communication network, wherein especially a different behavior regarding keep-alive messages is applied towards and/or from the first mobile communication network versus towards and/or from the second mobile communication network.

It is thereby advantageously possible to provide a fully operational interworking between the first and second mobile communication networks via the emulation function.

According to the present invention, it is advantageously furthermore possible and preferred that the plurality of network functions or services comprise at least the following:
  a network repository function (NRF),
  an access and mobility management function (AMF),
  a session management function (SMF),
  an authentication server function (AUSF),
  a user plane function (UPF),
  a unified data management function (UDM),
  a policy and charging function (PCF),
wherein especially the plurality of emulated network functions or services of the first interface of the emulation function comprise emulated network functions or services corresponding to the network functions or services, wherein an appropriate one of the first individual interfaces or first individual interface types is provided and/or implemented between each one of the plurality of network functions or services and its respective corresponding emulated network function of the plurality of emulated network functions or services, and wherein the plurality of network elements comprise at least the following:
  a home subscriber server (HSS),
  a mobility management entity (MME),
  a packet gateway control plane function (PGW-C),
  a packet gateway user plane function (PGW-U),
  a serving gateway control plane function (SGW-C),
  a serving gateway user plane function (SGW-U),
  a policy and charging rules function (PCRF),
wherein especially the plurality of emulated network elements of the second interface of the emulation function comprise emulated network elements corresponding to the network elements, wherein an appropriate one of the second individual interfaces or second individual interface types is provided and/or implemented between each one of the plurality of network elements and its respective corresponding emulated network element of the plurality of first emulated network elements.

It is thereby advantageously possible to provide a fully operational interworking between the first and second mobile communication networks via the emulation function.

According to the present invention, it is advantageously possible and preferred that the emulation function comprises a plurality of emulation functions or emulation services, wherein each one of the emulation functions or emulation services comprise at least one of the emulated network functions or services and one of the emulated network elements.

Thereby, it is advantageously possible to provide for an exemplary embodiment of the inventive interworking between the first and second mobile communication network, providing for an N:M mapping between different functionalities in the different networks.

According to the present invention, it is advantageously possible and preferred that the emulation function comprises an emulation repository and discovery function that is seen by the first mobile communication network as a network repository function.

Thereby, it is advantageously possible to allow the first mobile communication network to apply the discovery mechanisms used in 5G networks.

Furthermore, it is advantageously possible and preferred according to the present invention that the emulation function is part of an IPX system providing the possibility to link the first mobile communication network and the second mobile communication network.

Thereby, it is advantageously possible to not only link the first and second mobile communication network but by providing an IP exchange service between more than two networks, a flexible and efficient interworking between all these networks is possible.

Furthermore, it is advantageously possible and preferred according to the present invention that the method further comprises the following additional steps:
  in a first additional step, a specific modification within one of the first and second mobile communication networks regarding the corresponding plurality of network functions or services or network elements is transmitted to the emulation function,
  in a second additional step, subsequent to the first additional step, the specific modification within the one of the first and second mobile communication networks regarding the corresponding plurality of network functions or services or network elements is translated to or into a corresponding specific modification of the first or second interface of the emulation function, wherein the corresponding specific modification corresponds to
  a modification of the plurality of emulated network elements of the second interface of the emulation function in case of the specific modification in the first step corresponds to a modification of the plurality of network functions or services of the first mobile communication network, and to
  a modification of the plurality of emulated network functions or services of the first interface of the emulation function in case of the specific modification in the first step corresponds to a modification of the plurality of network elements of the second mobile communication network,
wherein the modification of the plurality of emulated network elements of the second interface and/or the modification of the plurality of network elements of the second mobile communication network corresponds to either a reconfiguration of the second mobile communication network, especially a reconfiguration of the operations and maintenance (OAM) system, or a reconfiguration of a network-network interface (NNI) domain name system (DNS), and
wherein the modification of the plurality of emulated network functions or services of the first interface and/or the modification of the plurality of network functions or services of the first mobile communication network corresponds to a network functions profile modification.

Thereby, it is advantageously possible to flexibly respond to changes in the first mobile communication network to be reflected in the second mobile communication network, and vice versa.

According to a further preferred embodiment of the present invention, in a further additional step, subsequent to the second additional step, the specific modification is operatively applied by the first and second mobile communication networks.

Thereby, it is advantageously possible to operatively apply the modifications within the mobile communication networks.

Furthermore, the present invention relates to a system for an improved emulation and/or interworking functionality between a first mobile communication network and a second mobile communication network, wherein the first mobile communication network is a mobile communication network realizing dynamic deployment or configuration of a plurality of network functions or services such that the plurality of network functions or services composing this network discover interconnection endpoints via which communication with other network functions or services in this network or another network is able to be realized via querying a network function registry, and wherein the second mobile communication network is a mobile communication network comprising a plurality of network elements, wherein the plurality of network elements composing the second mobile communication network are configured with interconnection endpoints via which communication with other network elements in the second mobile communication network or another network is able to be realized, wherein the improved emulation and/or interworking functionality is realized via providing an emulation function comprising a first interface towards the first mobile communication network, and a second interface towards the second mobile communication network, the system comprising the emulation function as well as the first and second mobile communication network, wherein the first interface comprises a plurality of emulated network functions or services corresponding to and/or interacting with the plurality of network functions or services, and wherein the second interface comprises a plurality of emulated network elements corresponding to and/or interacting with the plurality of network elements, wherein the system is configured such that:
the emulation function and its first and second interfaces— especially using the respective plurality of emulated network functions or services and emulated network elements— implement an exchange of messages towards and/or from both the first and second mobile communication network, thereby especially mapping between equivalent capabilities and/or needs of the respective network functions or services and network elements and providing for
    the implementation of the first individual interfaces or first individual interface types between the network functions or services and the respective corresponding emulated network functions or services, especially in the form of application programming interfaces (APIs), and
    the implementation of the second individual interfaces or second individual interface types between the network elements and the respective corresponding emulated network elements, especially in the form of network standard-specific interfaces or protocols.

Furthermore, the present invention relates to an emulation function for an improved emulation and/or interworking functionality between a first mobile communication network and a second mobile communication network, the first mobile communication network being a mobile communication network realizing dynamic deployment or configuration of a plurality of network functions or services such that the plurality of network functions or services composing this network discover interconnection endpoints via which communication with other network functions or services in this network or another network is able to be realized via querying a network function registry, and wherein the second mobile communication network is a mobile communication network comprising a plurality of network elements, wherein the plurality of network elements composing the second mobile communication network are configured with interconnection endpoints via which communication with other network elements in the second mobile communication network or another network is able to be realized, wherein the improved emulation and/or interworking functionality is realized via providing the emulation function comprising a first interface towards the first mobile communication network, and a second interface towards the second mobile communication network, wherein the first interface comprises a plurality of emulated network functions or services corresponding to and/or interacting with the plurality of network functions or services, and wherein the second interface comprises a plurality of emulated network elements corresponding to and/or interacting with the plurality of network elements,
wherein the emulation function is configured such that:
the emulation function and its first and second interfaces— especially using the respective plurality of emulated network functions or services and emulated network elements— implement an exchange of messages towards and/or from both the first and second mobile communication network, thereby especially mapping between equivalent capabilities and/or needs of the respective network functions or services and network elements and providing for
    the implementation of the first individual interfaces or first individual interface types between the network functions or services and the respective corresponding emulated network functions or services, especially in the form of application programming interfaces (APIs), and
    the implementation of the second individual interfaces or second individual interface types between the network elements and the respective corresponding emulated network elements, especially in the form of network standard-specific interfaces or protocols.

Still additionally, the present invention relates to a program comprising a computer readable program code which, when executed on a computer and/or on a network node of a mobile communication network and/or on an emulation function, or in part on a network node of a mobile communication network and in part on an emulation function, causes the computer and/or the network node of the mobile communication network and/or the emulation function to perform an exemplary embodiment of the inventive method.

Furthermore, the present invention relates to a computer program product for an improved emulation and/or interworking functionality between a first mobile communication network and a second mobile communication network, the computer program product comprising a computer program stored on a storage medium, the computer program comprising program code which, when executed on a computer and/or on a network node of a mobile communication network and/or on an emulation function, or in part on a network node of a mobile communication network and in part on an emulation function, causes the computer and/or the network node of the mobile communication network and/or the emulation function to perform an exemplary embodiment of the inventive method.

These and other characteristics, features and advantages of the present invention will become apparent from the following detailed description, taken in conjunction with the accompanying drawings, which illustrate, by way of example, principles of the invention. The description is given for the sake of example only, without limiting the scope of the invention. The reference figures quoted below refer to the attached drawings.

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a first mobile communication network 100 and a second mobile communication network 200 with an emulation function 500 are schematically shown. The first mobile communication network 100 is implemented comprising a first radio access network 110 and a first core network 120, the first radio access network 110 exemplarily comprising a first base station entity 111 serving a first radio cell 10 or a corresponding radio coverage area. Likewise, the second mobile communication network 200 is implemented comprising a second radio access network 210 and a second core network 230, the second radio access network 210 exemplarily comprising a second base station entity 211 serving a second radio cell 10' or a corresponding radio coverage area. Typically such cellular mobile communication networks 100, 200 comprise a multitude of different base station entities and a corresponding plurality of radio cells. The first and second mobile communication networks 100, 200 are typically used to provide communication services to a number of user equipments connected or attached or registered to these mobile communication networks. In FIG. 1, only a first user equipment 20 and a second user equipment 220 is schematically shown, the first user equipment 20 having the first mobile communication network 100 as its home network (or home public land mobile network), and the second user equipment 220 having the second mobile communication network 200 as its home network (or home public land mobile network). The situation shown in FIG. 1 corresponds to a roaming situation for both the first and the second user equipments 20, 220: The first user equipment 20 is roaming to (or in) the second mobile communication network 200, and the second user equipment 220 is roaming to (or in) the first mobile communication network 100.

The first mobile communication network 100 comprises a plurality of network functions or network services 140, and the second mobile communication network 200 comprises a plurality of network elements 240. The emulation function 500 comprises a first interface 510 towards the first mobile communication network 100, and a second interface 520 towards the second mobile communication network 200.

The first mobile communication network 100 is typically a 5G-network (or a higher generation (than 5G) mobile communication network). This means that the first mobile communication network 100 is a mobile communication network realizing dynamic deployment or configuration of its plurality of network functions or services 140 such that the plurality of network functions or services 140 composing this network discover interconnection endpoints via which communication with other network functions or services in this network or another network is able to be realized via querying a network function registry or network repository function. The second mobile communication network 200 is typically a 4G-network (or a lower generation (than 4G) mobile communication network), i.e. the second mobile communication network 200 is a mobile communication network comprising a plurality of network elements 240, wherein the plurality of network elements 240 composing the second mobile communication network 200 are configured with interconnection endpoints via which communication with other network elements in the second mobile communication network 200 or another network is able to be realized.

It is conventionally known how to provide or enable roaming between a 5G and a 4G mobile communication network, such as the first and second mobile communication network 100, 200. In order to provide a user equipment in a 5G System connectivity to a Data Network (e.g. the Internet), the user equipment is connected to an access network (e.g. gNBs, WiFi access) and a core network provides connectivity towards the data network. The user equipment possesses a subscription to the network it is attached which the core network evaluates so as to among other things confirm that the user equipment has indeed the right to access the requested resources. In a roaming case, a user equipment with a subscription to, e.g., a first network is attached to a second network as a visited network, which has a roaming agreement with the first network to either forward Control Plane (CP) and User Plane (UP) traffic towards the first network (home routed case) or to locally route the user plane traffic (local breakout case). In the context of 5G, the local breakout and home-routed cases differ in the amount of inter-network interface required for performing CP/UP communication between the home and visited networks; 3GPP document TS 23.501 defines the interfaces between the visited and home 5G network cores in the roaming case. It is known to the visited network that a given user equipment is a subscriber of another network. In order for a 5G core network function to be able to communicate with network functions of another network (e.g. of another PLMN, identified by a PLMN ID different than that of the own network), the network function(s) in the visited network either have local configuration pointing to network functions in each specific home network with which a roaming agreement exists or the Network Repository Function (NRF) is used to discover such network functions of the home network. Among 5G networks, it is possible to identify the next hop network repository function based on local configuration or stored network function profiles of network repository functions from other networks. After the discovery requestor has received the network function profile search result, a request can then be sent directly or indirectly via a SEPP proxy (security edge protection proxy) towards the target network function. For each roaming partner, additional configuration and connectivity configurations need be setup. SEPP proxies are used to secure communications between the roaming partners, requiring additional configuration between each network pair. One or more IP exchange services (IPX) can be placed in the path. The IPX service provides connectivity services between the several roaming partners but is not a functional entity in the sense that network functions are not aware of its presence. As such, each 5G core network need to contain network-specific configuration to a) be able to properly setup SEPP connectivity towards other networks, and b) contain local configuration of network functions in other networks (NRF/NSSF or directly relevant NFs). In the context of pre-5G roaming, IPX services route messages (e.g. Diameter, SCTP protocols) based on static routing tables. In 4G, the architecture in the roaming case is specified in TS 23.401 (especially clause 4.2.2).

In order to find Endpoints for the services required by a network (e.g. HSS for Diameter requests), a DNS-based resolution system is defined by GSMA in IR.67, DNS and ENUM Guidelines for Service Providers and GRX and IPX Providers. IR.67 specifies the FQDNs networks can query in order to find required endpoints, e.g. <Network_Label>.mnc<MNC>.mcc<MCC>.gprs is used in GPRS for the Operator ID in APNs.

Figure 2:
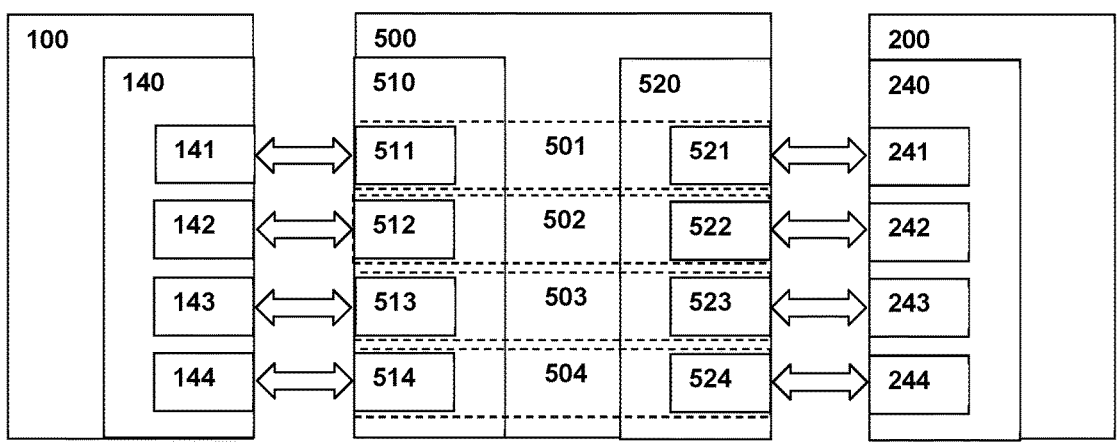

In FIG. 2, the first and second mobile communication network 100, 200 are represented with the emulation function in a somewhat different representation providing more details regarding the interface between the first mobile communication network 100 and the emulation function 500 as well as between the second mobile communication network 200 and the emulation function 500. From FIG. 2, it can be seen that the first interface 510 of the emulation function 500 comprises a plurality of emulated network functions or services 511, 512, 513, 514 corresponding to and/or interacting with the plurality of network functions or services 140 of the first mobile communication network 100, and wherein the second interface 520 of the emulation function 500 comprises a plurality of emulated network elements 521, 522, 523, 524 corresponding to and/or interacting with the plurality of network elements 240 of the second mobile communication network 200. From FIG. 2, it can furthermore be seen that the plurality of network functions or services 140 are split into a first network function or service 141, a second network function or service 142, a third network function or service 143, and a fourth network function or service 144. Likewise, the plurality of network elements 240 are split into a first network element 241, a second network element 242, a third network element 243, and a fourth network element 244. The emulation function 500 furthermore comprises a plurality of emulation functions or emulation services 501, 502, 503, 504, wherein each one of the emulation functions or emulation services 501, 502, 503, 504 comprise at least one of the emulated network functions or services 511, 512, 513, 514 and one of the emulated network elements 521, 522, 523, 524.

Figure 3:
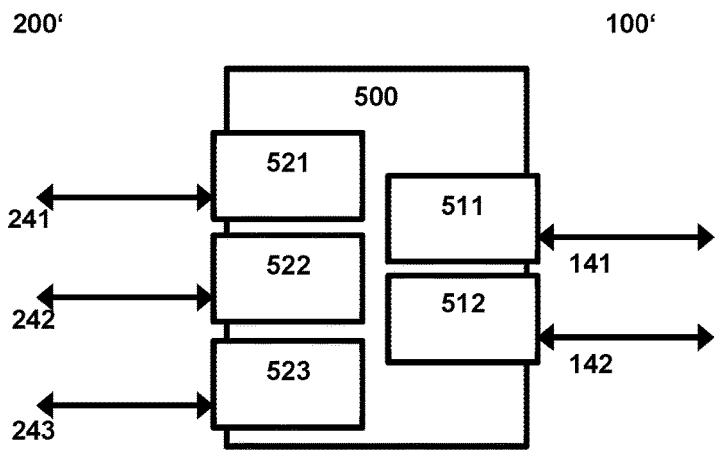
FIGS. 3-4 schematically illustrate mainly the emulation function according to the present invention.

However, the mapping between network functions or services 140 (of the first mobile communication network 100) and network elements 240 (of the second mobile communication network 200)—i.e. typically the mapping between 4G and 5G functionality—is primarily not 1:1, but rather N:M. Hence, also the emulation functions or emulation services 501, 502, 503, 504 do not match 1:1 with at least one of the first and second mobile communication network 100, 200. For example, the functionality performed in 4G-systems by the mobility management entity is split into access and mobility management function and session management function in a 5G system. Analogously, 4G home subscriber server functionality is split in 5G-systems into the authentication server function and the unified data management, each with its own interface and potentially, its own protocol. E.g. the unified data management may use HTTP/2, the authentication server function may use in future HTTP/3 and home subscriber server diameter protocols. This is exemplarily shown in FIG. 3, where the emulation function 500 is shown with N emulated network elements, and M emulated network functions and services. Exemplarily, the emulated network functions and services 511, 512, and the emulated network elements 521, 522, 523 are shown. To the left hand side of the emulation function 500, the protocol stack 200' of the second mobile communication network 200 is schematically indicated together with the interfaces to the respective network elements 241, 242, 243, and to the right hand side of the emulation function 500, the protocol stack 100' of the first mobile communication network 100 is schematically indicated together with the interfaces to the respective network functions and services 141, 142. This requires the emulation function 500 to provide multiplexing/demultiplexing capabilities where one message can generate multiple messages on multiple interfaces and vice-versa. The emulation function 500 is configured to keep an internal message procedure state to be properly able to multiplex/demultiplex messages. The following cases are taken into account:

Generation of outgoing messages once the necessary information has been received (e.g. N 4G messages), Need to roll back OK-ed incoming messages (e.g. responded with HTTP 200 OK) depending on the response to the outgoing message.

There is a need for dynamic endpoints and configuration: In 5G-systems (hence in the first mobile communication network 100), endpoint addresses are dynamic. Network functions and services register API (application programming interface) endpoints in the network repository function (NRF), where they can then be discovered by network function service consumers. NRF-based discovery results in:

network function endpoints and/or capabilities to be emulated may not be known until they register at a network repository function and that network function profile becomes known to the emulation endpoint or the system configuring the emulation function;

Created 5G endpoints will not be discoverable to network function service consumers unless they are registered in an network repository function;

network function endpoints may be removed, which then results in the removal of related network function endpoints;

network function endpoints may be changed, which then results in changing the mapping between the 4G endpoint (in the second mobile communication network 200) and 5G endpoint (in the first mobile communication network 100) (the 4G endpoint need not be changed);

The capabilities to be emulated may change over time (e.g. a network function registers an additional network function service into the network function profile).

This results in the need to have the capability to interwork with the network repository function (in networks relying on network function profile discovery/registration mechanisms, e.g. 5G, i.e. the first mobile communication network 100), either directly or via a management function, as well as to convey this information to networks not relying on network function profile discovery/registration mechanisms, e.g. pre-5G, such as the second mobile communication network 200.

Figure 4:
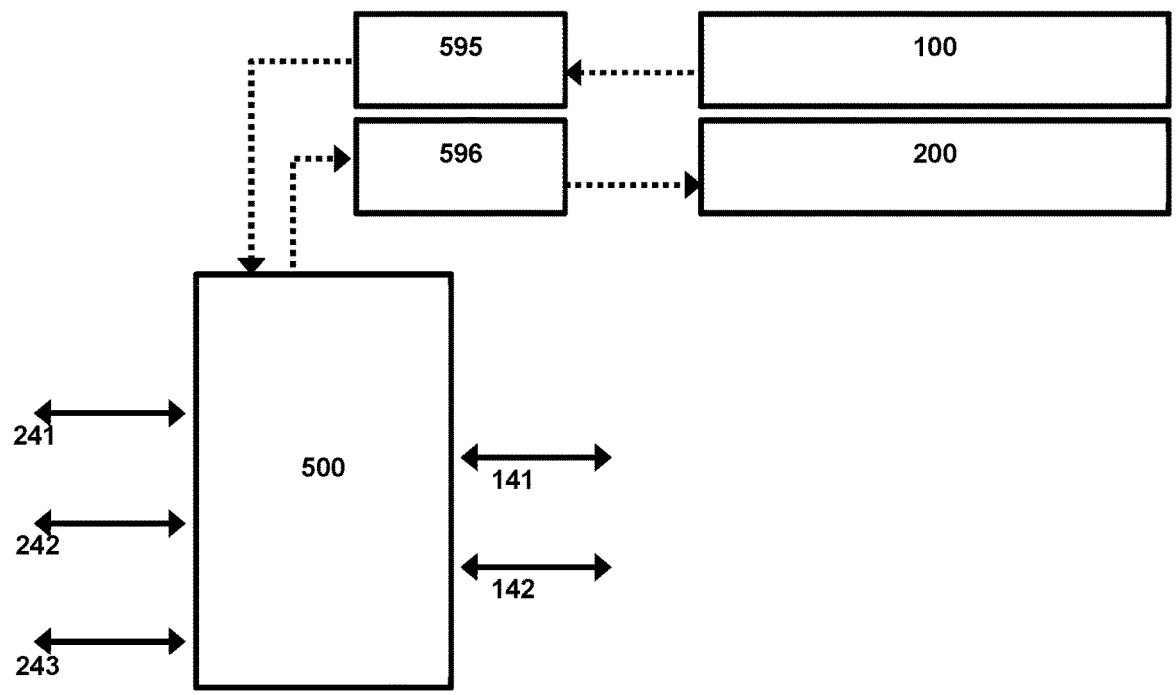

There are, hence, different capabilities between different technologies, and capabilities may also change over time. The emulation function 500 is able to map between equivalent capabilities (e.g. an IP PDU session establishment), but some 5G features (e.g. native Ethernet PDU session support) are not possible in 4G. As such,

- from the 5G side (first mobile communication network 100), the emulation functions or emulation services' capabilities need to be accessible via the network repository function API from the point of view of the 5G network;
- from the 4G and 5G side (i.e. both the first and the second mobile communication network 100, 200), the requests querying capabilities need to return the actual capabilities being supported (intersection of the capabilities offered by both technologies accessible via the emulating function 500);
- requests requiring non-supported capabilities are likely to be rejected by the emulation function 500. This is schematically represented in FIG. 4: network function profile information or profiles 595 are provided to the emulation function 500 by the network relying on network function profile dynamic discovery/registration (e.g. 5G), i.e. the first mobile communication network 100, and network element configuration information 596 is provided to the network, as the second mobile communication network 200, not relying on network function profile dynamic discovery/registration (e.g. 4G). The other interfaces of the emulation function 500 being identical to the one represented in FIG. 3.

Between the first and second mobile communication network 100, 200, there are different requirements in terms of keep-alive messages: Protocols such as HTTP do not require message keep-alive messages and do not keep a connection alive at the application protocol layer. Other protocols used on pre-5G control plane elements, such as GTP-C (GPRS Tunneling Protocol-Control), PFCP (Packet Forwarding Control Protocol) do require keep-alive messages. In order to properly emulate the functionality, the emulation function 500 requires to also maintain the connection status of the protocol stack, or else network elements 241, 242, 243, 244 (of the second mobile communication network 200) may end up terminating session because a protocol connection loss was triggered.

In FIG. 5, again the first and second mobile communication network 100, 200 are shown together with the emulation function 500, providing a more detailed view, especially on the interfaces used by the components of the mobile communication networks 100, 200 towards the emulation function 500. In the exemplary embodiment of FIG. 5, the emulation function 500 comprises or is able to access or is assigned to an emulation management function 550 that is used to mapping of 5G network function profiles to exposed endpoints (i.e. to the emulation functions or emulation services 501, 502, 503, 504 in the emulation function 500); the emulation management function 550 receives information from a configuration entity 290 of the second mobile communication network 200. Again, the protocol stack 100' of the first mobile communication network 100 and the protocol stack 200' of the first mobile communication network 200 is schematically indicated. In the exemplary embodiment shown in FIG. 5, the first mobile communication network 100 comprises the first network function or service 141 as the network repository function of the first mobile communication network 100, the second network function or service 142 as the access and mobility management function (of the first mobile communication network 100), the third network function or service 143 as the session management function, the fourth network function or service 144 as the user plane function, and a fifth network function or service 145 as the policy and charging function. The emulation function 500 comprises the first emulation function or emulation service 501 as a network emulation repository and discovery function, the second emulation function or emulation service 502 as an emulation subscriber function, the third emulation function or emulation service 503 as an emulation session function, and the fourth emulation function or emulation service 504 as an emulation policy function. Especially, in the exemplary embodiment shown in FIG. 5, the second, third, and fourth emulation function or emulation service 502, 503, 504 form or are able to be regarded as emulation function services (as compared to the first emulation function or emulation service 501, realizing the functionality of the network repository function regarding the emulation function 500. The second mobile communication network 200 comprises the first network element 241 as the home subscriber server of the second mobile communication network 200, the second network element 242 as the mobility management entity (of the second mobile communication network 200), the third network function or service 243 as the packet gateway control plane function or serving gateway control plane function, the fourth network function or service 244 as the packet gateway user plane function or serving gateway user plane function, and a fifth network function or service 245 as the policy and charging rules function. The arrow 141' indicates network function discovery. The arrow 141" indicates network function profile changes. The arrow 502' indicates an interface Nausf API. The arrows 502" indicate an interface Nudm API. The arrow 502' indicates an interface Nsmf API. The arrow 503' indicates N3 traffic. The arrow 504' indicates Npcf API. The arrow 241' indicates an interface for subscriber data and/or authentication. The arrow 243' indicates a session control interface. The arrow 244' indicates a user plane interface. The arrow 245' indicates a policy interface.

Figure 5:
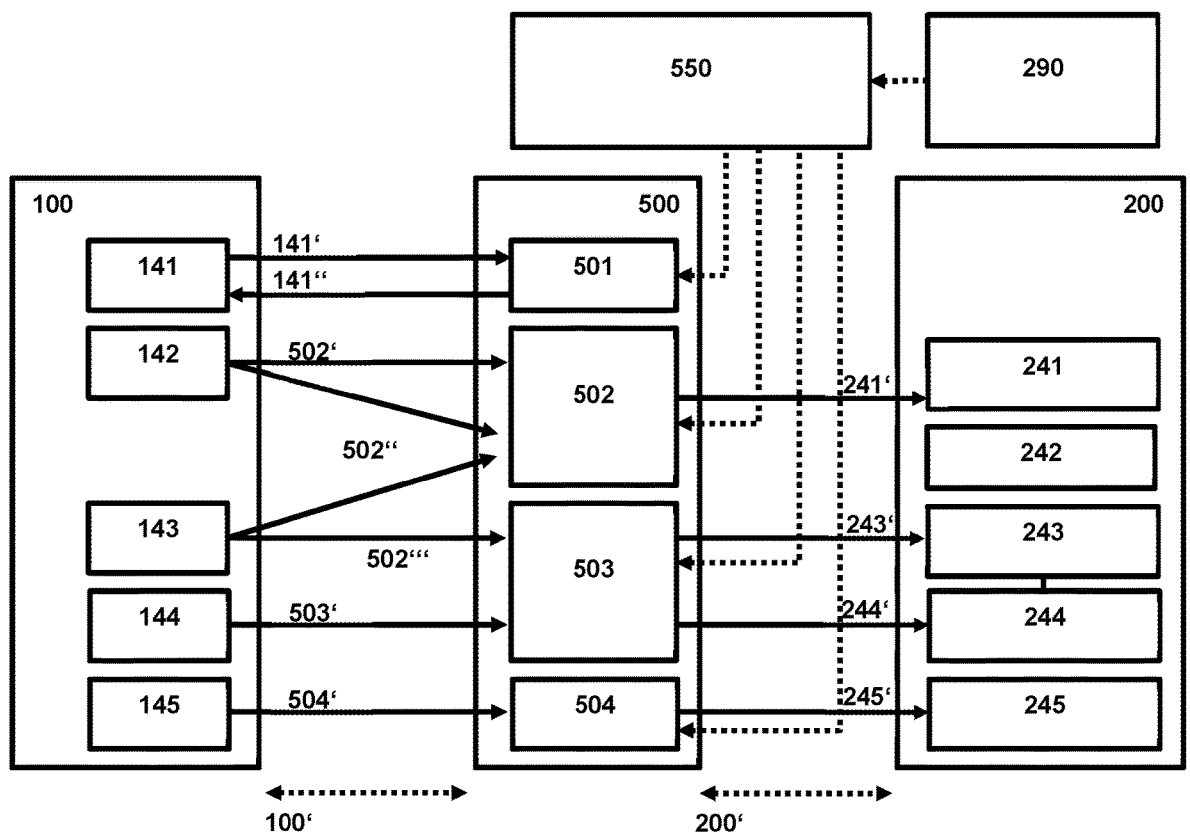

According to the exemplary embodiment of FIG. 5, the 5G Network Emulation Repository and Discovery Function (5G-NERD-F) is seen by the first mobile communication network 100 as an 5G network repository function, i.e. allows network functions or services in the first mobile communication network 100 to discover 5G network functions. The 5G-NERD-F returns to the first mobile communication network 100 network function profiles exposing Service Based Interfaces (SBI interfaces) offered by the emulation function 500 (or the IPX service) that provides an emulated 5G view of the second mobile communication network 200. Based on the configuration of the underlying non-5G network (second mobile communication network 200), matching 5G network function profiles are discoverable in the 5G-NERD-F. e.g. a configured home subscriber server leads to a discoverable AUSF and UDM network function profile.

According to the present invention, it is provided for notifications of network function profile changes to subscribed network function consumers: the emulation function 500 (or 5G Emulation Function 5G-EF), or each emulation function or emulation service 501, 502, 503, . . . exposes one or more SBI APIs towards the first mobile communication network 100. These API endpoints are discovered via the network repository function of the emulation function 500 (i.e. NERD-F) and offer 5G functionality. The emulation function or emulation service 501, 502, 503, . . . (i.e. each 5G-EF) is tasked with performing:

Protocol translation: e.g. from HTTP/2 in 5G to GTP-C or Diameter in 4G;

Protocol adaptation: e.g. changing message elements referring to endpoints in Network B to endpoints in the IPX service and vice-versa;

Parameter Mapping to ensure 4G/5G interoperability;

Procedure adaptation: e.g. 5G procedures separate authentication messages in the Nausf API exposed by the AUSF NF and subscriber-related information in the Nudm API exposed by the UDM NF. In 4G, both functions are performed by the HSS. As such:

A single 5G SBI message may not translate 1:1 into a non-SBI protocol message

The 5G-EF (i.e. the emulation function 500) is able to generate one or more non-SBI protocol messages on one or more interfaces based on one or more 5G SBI messages, i.e. message-wise 1:1, 1:N, N:1 via one or more interfaces on each side (e.g. several SBI messages via Nausf and Nudm APIs originate a single messages towards HSS);

Capability management: E.g. some capabilities such as native Ethernet PDU sessions may not be supported by the underlying non-5G network. This enables the emulation function 500 to Reject requests requiring unsupported capabilities Answer to capability requests from the first mobile communication network 100 with supported capabilities matching those (or a subset of) those of the underlying network.

Based on the network element configuration of the second mobile communication network 200, the emulation management function 550:

configures 5G-NERD-F to expose network function profiles;

configures the mapping of the 5G-EFs emulating network elements of the second mobile communication network 200;

receives and processes configuration changes (e.g. NE added/removed/modified);

based on the network configuration (i.e. the network elements to expose), matching 5G-emulation functions or emulation services need to be configured and 5G network function profiles are generated exposing the exposed endpoints of the 5G-emulation functions or emulation services;

additionally:

when new network elements are added (with the second mobile communication network 200), the configuration of existing or new 5G-emulation functions or emulation services instances and generation of new network function profiles when network elements are removed or changed, removal/change of network function profiles in 5G-NERD-F, re-configuration of relevant 5G-emulation functions or emulation services including de-instantiation of 5G-EF instances.

Via this, e.g., 5G-4G emulation and interworking example, realized by the emulation function 500, an network repository function interface (Nnrf) is exposed that points requesting 5G network function consumers to endpoints of 5G-emulation functions or emulation services 501, 502, . . . impersonating the 4G network functionality behind it (i.e. of the second mobile communication network 200)

Figure 8:
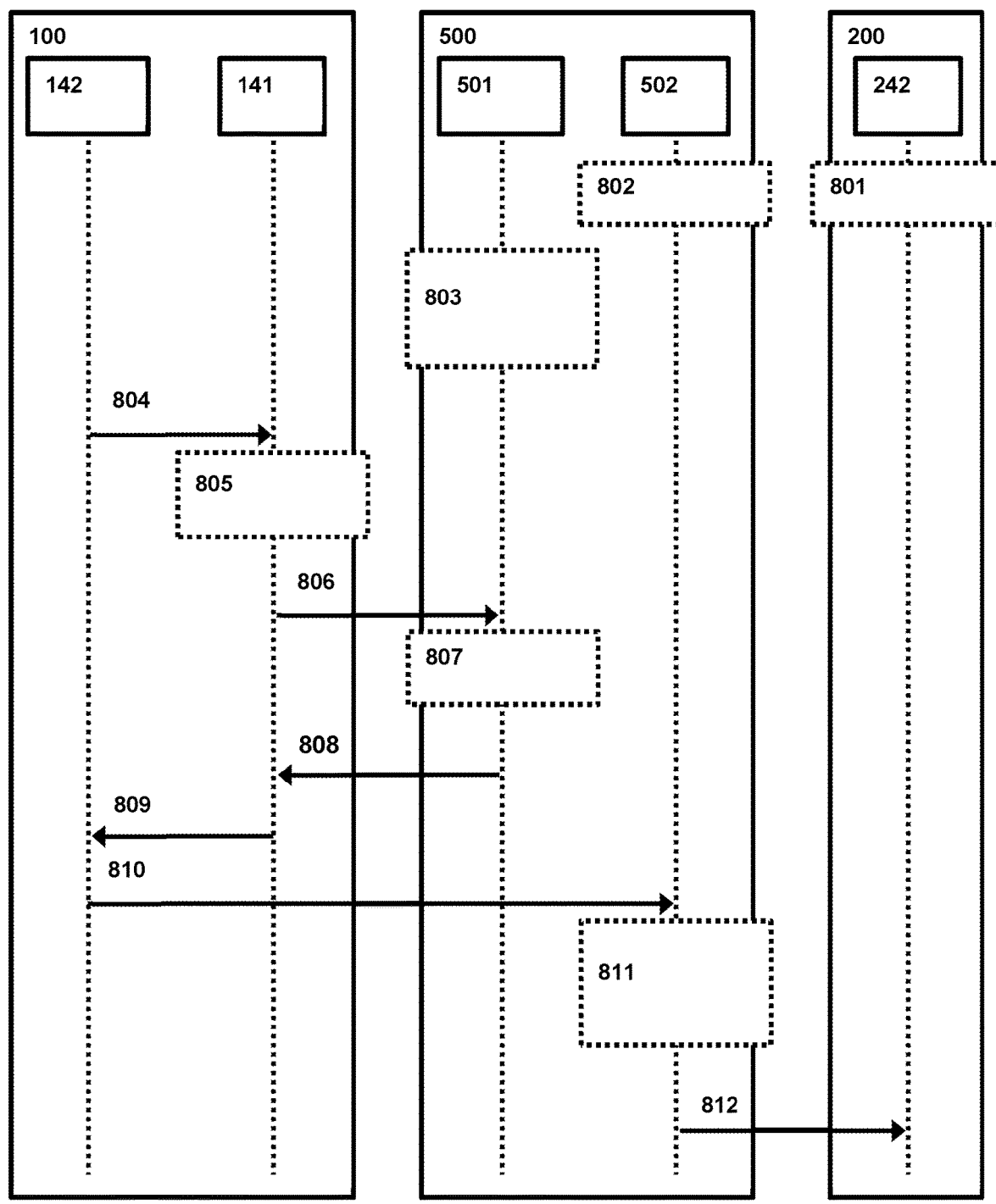
FIGS. 8-14 schematically illustrate communication diagrams related to the emulation function implementing a modification occurring within one of the first and second mobile communication networks, and reflecting such modification in the other mobile communication network.
Figure 9:
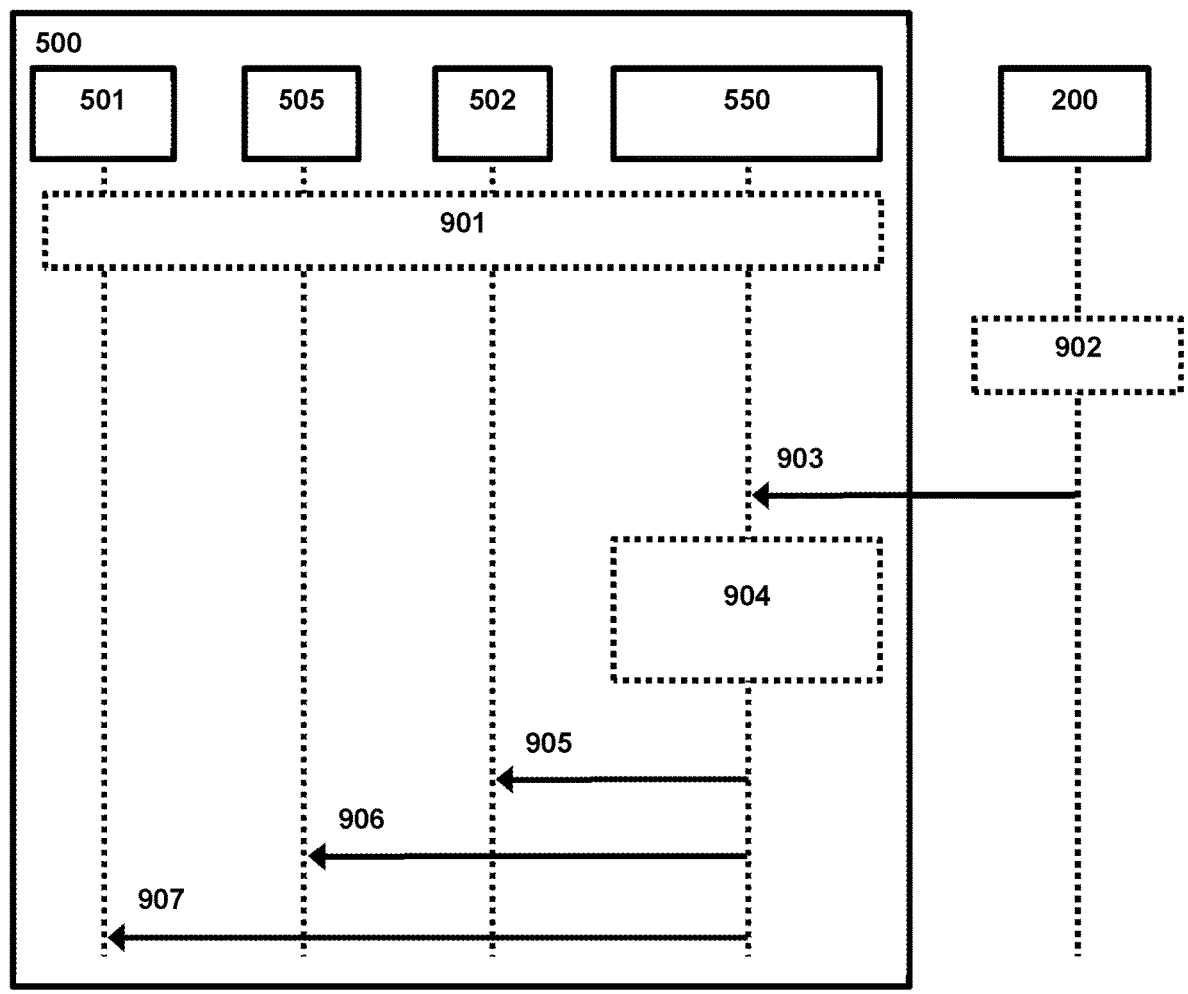
Figure 10:
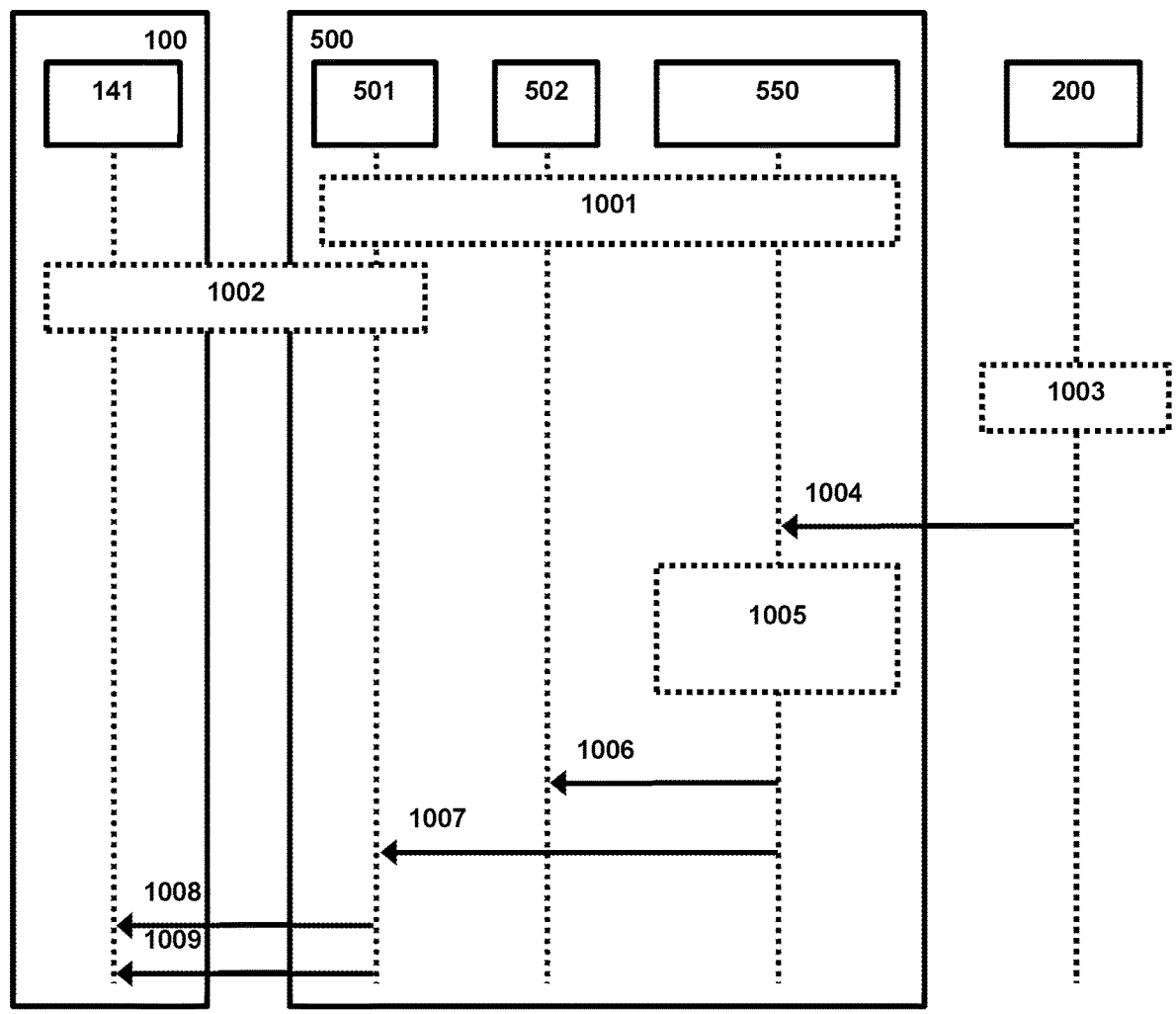

The flow diagrams of FIGS. 8 to 10 show such an interworking between a 5G and a non-5G network (first and second mobile communication network 100, 200) according to the present invention.

In FIG. 8, it is considered that changes in the second mobile communication network 200 (e.g. new network element or changes/removal of existing network elements) occur that need to be reflected or communicated to the first mobile communication network 100: In a first processing step 801 according to FIG. 8, the 5G-emulation function or emulation service 502 is accessible via an endpoint Y. In a second processing step 802 according to FIG. 8, the new (or modified) network element of the second mobile communication network 200 is accessible via Endpoint Z. In a third processing step 803 according to FIG. 8, the network function profile is configured to map the network element of the second mobile communication network 200 to a 5G emulation function or emulation service 501, served by the emulation function 500. In a fourth processing step 804 according to FIG. 8, a discovery request (for a network function NFx in the second mobile communication network 200) is sent by a network function or service 142 of the first mobile communication network 100 to the network repository function 141. In a fifth processing step 805 according to FIG. 8, the network repository function 141 is configured to route roaming requests to the emulation function 500. In a sixth processing step 806 according to FIG. 8, a discovery request for the network function NFx in the second mobile communication network 200 is sent to the 5G emulation function or emulation service 501. In a seventh processing step 807 according to FIG. 8, the request is mapped to a network function profile from the 5G-emulation function or emulation service 501. In an eighth processing step 808 according to FIG. 8, the network function profile of the 5G-emulation function or emulation service 501 is returned with the indication that it is accessible via endpoint Y. In a ninth processing step 809 according to FIG. 8, the network function profile of the 5G-emulation function or emulation service 501 is returned with the indication that it is accessible via endpoint Y. In a tenth processing step 810 according to FIG. 8, a request to endpoint Y (5G protocol stack) is transmitted to the 5G-emulation function or emulation service 502. In an eleventh processing step 811 according to FIG. 8, 5G-emulation function or emulation service 502 performs protocol translation/adaptation and/or procedure adaptation. In a twelfth processing step 812 according to FIG. 8, the request for the network element 242 in the second mobile communication network 200 is directed to endpoint Z (using the protocol stack of the second mobile communication network 200).

In FIG. 9, the flow diagram of an addition of a new network element in the second mobile communication network 200 is shown. In a first processing step 901 according to FIG. 9, it is supposed that the existing configuration of the second mobile communication network 200 is reflected in the network function profiles and the 5G emulation functions or emulation services 501, 502, 505. In a second processing step 902 according to FIG. 9, a new network element is configured in the second mobile communication network 200. In a third processing step 903 according to FIG. 9, the new network element is added to the second mobile communication network's 200 configuration, and a respective message is transmitted to the emulation function 500, especially the emulation management function 550. In a fourth processing step 904 according to FIG. 9, a mapping is performed, by the emulation management function 550, of the added network element to network function profile(s)

and 5G-emulation functions or emulation services. In a fifth processing step, 905 according to FIG. 9, an existing 5G-emulation function or service 502 is configured to emulate the new network element; alternatively, (in case that a new 5G-emulation function or service 505 is used or required) in a sixth processing step 906 according to FIG. 9, the new 5G-emulation function or service 505 is configured to emulate the new network element. In a seventh processing step, 907 according to FIG. 9, the network function profiles of the new emulation function or service 505 or of the existing emulation function or service 502 is/are configured with the 5G-emulation functions or services exposed capabilities emulating network elements.

Similarly, network function service consumers are able to subscribe to network function profile changes on the 5G-NERD-F and be notified when a change in the second mobile communication network's 200 network element configuration triggers a change in the subscribed network function profile(s). In FIG. 10, the flow diagram of network function or service within the first mobile communication network 100 being notified of or about a change or a removal of a network element in the second mobile communication network 200 is shown. In a first processing step 1001 according to FIG. 10, it is supposed that the existing configuration of the second mobile communication network 200 is reflected in the network function profiles and the 5G emulation functions or emulation services 501, 502, 505 in the emulation function 500. In a second processing step 1002 according to FIG. 10, a network function or service 141 of the first mobile communication network 100 subscribes to changes on existing 5G-emulation functions or services. In a third processing step 1003 according to FIG. 10, an existing network element within the second mobile communication network 200 is removed or changed. In a fourth processing step 1004 according to FIG. 10, the change (new or modified network element or removed one) is performed in the second mobile communication network's 200 configuration, and a respective message is transmitted to the emulation function 500, especially to the emulation management function 550. In a fifth processing step, 1005 according to FIG. 10, a mapping is performed, by the emulation management function 550, of the change performed (added network element or modified network element or removed network element) to network function profile(s) and 5G-emulation functions or emulation services. In a sixth processing step, 1006 according to FIG. 10, an existing 5G-emulation function or service 502 is configured to emulate the modification (i.e. new network element or modified network element or removed network element). In a seventh processing step 1007 according to FIG. 10, the corresponding network function profiles are reconfigured according to the new 5G-emulation function or service configuration of exposed capabilities emulating network elements. In an eighth processing step, 1008 according to FIG. 10, the subscribed network function consumers are notified of the change in network function profile(s), and in a ninth processing step, 1009 according to FIG. 10, the subscribed network function consumers are notified of the removed NF profile(s).

Hence, according to the present invention, a 5G network emulation and interworking with non-5G networks is enabled via a 5G network discovering 5G-emulation function or services via the 5G-NERD functionality, with the discovered 5G-emulation function or services not being actual 5G network function or services but rather emulation functions for non-5G network elements; these 5G-emulation functions or services are exposed and can be discovered and accessed as 5G network function or services. The 5G-emulation functions or services maintain the connection with the network elements in the non-5G network (second mobile communication network 200) and/or 5G network e.g. maintaining the SCTP connections, TCP connections; in case a 5G-emulation function or service detects a communication loss towards the network element (e.g. heartbeat fail), it sends a notification towards the emulation management function 550.

In FIG. 6, again the first and second mobile communication network 100, 200 are shown together with the emulation function 500 and the emulation management function 550, providing a more detailed view, especially on the interfaces used by the components of the mobile communication networks 100, 200 towards the emulation function 500. Again, the emulation function 500 comprises or is able to access or is assigned to an emulation management function 550 that is used to mapping of 5G network function profiles to exposed endpoints (i.e. to the emulation functions or emulation services 501, 502, 503, 504 in the emulation function 500) and configuration. Again, the protocol stack 100' of the first mobile communication network 100 and the protocol stack 200' of the first mobile communication network 200 is schematically indicated. In the exemplary embodiment shown in FIG. 6, the first mobile communication network 100 comprises the first network function or service 141 as the network repository function of the first mobile communication network 100, the second network function or service 142 as the unified data management function (of the first mobile communication network 100), the third network function or service 143 as the authentication server function, the fourth network function or service 144 as the session management function, the fifth network function or service 145 as the user plane function, and a sixth network function or service 146 as the policy and charging function. The emulation function 500 comprises, again, the first emulation function or emulation service 501 as a network emulation repository and discovery function, the second emulation function or emulation service 502 as an emulation subscriber and authentication function, the third emulation function or emulation service 503 as an emulation session function, and the fourth emulation function or emulation service 504 as an emulation policy function. Especially, in the exemplary embodiment shown in FIG. 6, the second, third, and fourth emulation function or emulation service 502, 503, 504 form or are able to be regarded as emulation function services (as compared to the first emulation function or emulation service 501, realizing the functionality of the network repository function regarding the emulation function 500). The second mobile communication network 200 comprises the first network element 241 as the operations and maintenance function of the second mobile communication network 200, the second network element 242 as the mobility management entity (of the second mobile communication network 200), the third network element 243 as the serving gateway (SGW) function (serving gateway control plane function (SGW-C) and/or serving gateway user plane function (SGW-U)) and/or as the packet gateway control plane function (PGW-C) and/or the packet gateway user plane function (PGW-U), and the fourth network element 244 as the policy and charging rules function. The arrow 141' indicates network function discovery (using Nnrf API as interface). The arrow 141" indicates network function profile changes. The arrow 502' indicates an interface Nudm API. The arrows 502" indicate an interface Nausf API. The arrow 503' indicates an interface Nsmf API. The arrow 503" indicates N3 traffic. The arrow 504' indicates Npcf API. The arrow 242' indicates an S6a interface. The arrow 243' indicates a S8 or S11 interface. The arrow 244' indicates a user plane interface.

The method and system according to the present invention is primarily described in view of the interworking of a 5G network (first mobile communication network 100) with a 4G network (second mobile communication network 200) but the invention is also applicable to standards or technologies other than 4G, e.g. 3G or 2G. Hence, a reference to 4G technology is to be understood as referring generically to "non-5G" (i.e. 4G, 3G or 2G); in order to indicate this, it is also used the term "XG".

Figure 6:
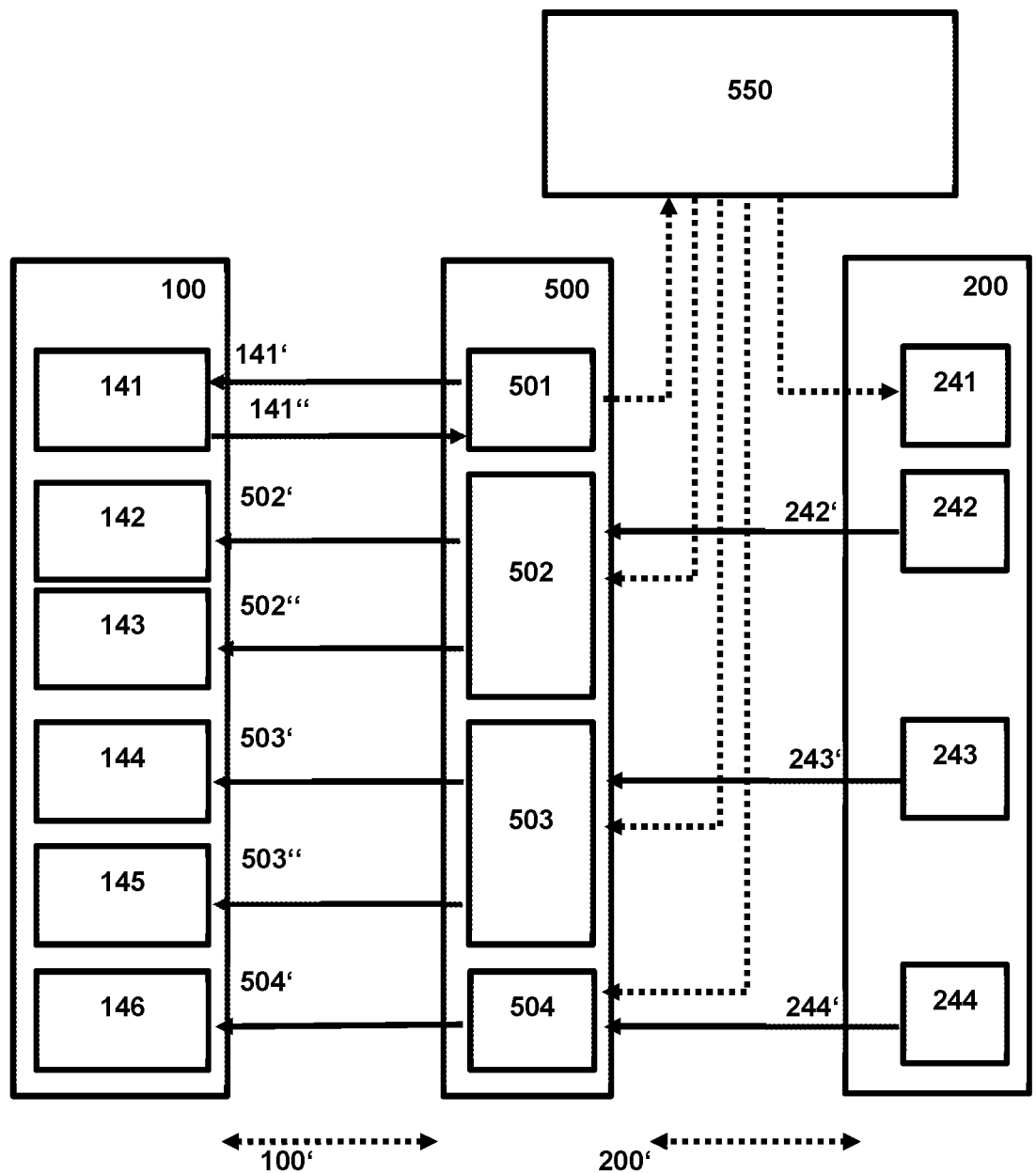

According to the exemplary embodiment of FIG. 6, a 4G network (second mobile communication network 200) uses the XG emulation services of the emulation function 500 (e.g. as an IPX service) to interconnect with 5G network functions or services in the first mobile communication network 100 (relating to a direct configuration of the first mobile communication network's 100 emulation addresses via the second mobile communication network's 200 OAM system). As for the second mobile communication network 200, the emulation function 500 according to the present invention seems to be a network using the same technology—as it behaves accordingly—(i.e. typically 4G, 3G or 2G), the network emulation repository and discovery function 501 is also called XG Network Emulation Repository and Discovery Function (XG-NERD-F); it is seen by the first mobile communication network 100 as a 5G network repository function, i.e. allows network functions and services in the second mobile communication network 200 to register network function profiles and to discover 5G network functions and services. The XG-NERD-F can receive network function profile registrations from network function consumers or other network repository functions, as well as network function profile notifications regarding network function profile changes/deletions. It also notifies the emulation management function of new/updated/removed network function profiles of the first mobile communication network 100.

Furthermore, the emulation function 500 comprises Non-5G (XG) Emulation Functions (XG-EF): each XG-EF exposes one or more 4G signaling endpoint(s) (e.g. GTP-C, Diameter) towards the 4G network (i.e. the second mobile communication network 200). These endpoints are known to the second mobile communication network 200 via their operations and maintenance system, which obtains them from the emulation management function 550. Each XG-EF is tasked with performing:
  Protocol translation: e.g. from HTTP/2 in 5G to GTP-C or Diameter in 4G
  Protocol adaptation: e.g. changing message elements referring to endpoints in the first mobile communication network 100 to endpoints in the IPX service and vice-versa
  Procedure adaptation: e.g. 5G procedures separate authentication messages in the Nausf API exposed by the AUSF NF and subscriber-related information in the Nudm API exposed by the UDM NF. In 4G, both functions are performed by the HSS. As such:
    A single 5G SBI message may not translate 1:1 into a non-SBI protocol message
    The XG-EF can generate one or more non-SBI messages on one or more interfaces based on one or more 5G SBI messages, i.e. message-wise 1:1, 1:N, N:1 via one or more interfaces on each side (e.g. several SBI messages via Nausf and Nudm APIs originate a single messages towards HSS)
  Capability management: e.g. some capabilities such as native Ethernet PDU sessions may be supported by the underlying 5G network but may not exist in the emulated network (e.g. 4G), as well as vice-versa. This enables the emulation function 500 (e.g. an IPX service) to
    Reject requests requiring unsupported capabilities
    Answer to capability requests from the second mobile communication network 200 with supported capabilities matching those (or a subset of) those of the underlying network Furthermore, the emulation function 500 comprises the emulation management function 550: Based on the information received from the XG-NERD-F,
  5G network function profiles are mapped to an emulated network elements configuration description to be used by the second mobile communication network 200, e.g. a AUSF and UDM NF profile are mapped to a HSS configuration
  Notification towards the second mobile communication network 200 of the current network element configuration, i.e. the XG-emulation function endpoints accessible by the second mobile communication network's 200 network elements and their capabilities or reconfiguration of the DNS resolving so that it points to the correct XG-emulation function endpoint.
  Based on the network configuration (i.e. the network elements to expose), matching XG-emulation functions need to be configured exposing the endpoints the second mobile communication network's 200 network elements will use. Additionally:
    When new network functions are added, the configuration of existing or new XG-emulation function instances, generation of new configurations and notification towards the second mobile communication network's 200 management system
    When network functions are removed or changed, the re-configuration or de-instantiation of XG-emulation function instances, generation of new configurations and notification towards the second mobile communication network's management system
  configures the mapping of the XG-emulation functions emulating network functions of the first mobile communication network 100
  receives and processes network function profile changes (e.g. network function profile added/removed/modified).

As an alternative to using the operations and maintenance system of the second mobile communication network 200, it is advantageously possible according to the present invention that the configuration of the second mobile communication network's 200 emulation addresses is realized via a DNS system (Domain Name System) 560 which is used for the resolution (cf. reference sign 561) of network addresses for the first mobile communication network 100.

This is exemplarily shown in FIG. 7 which again represents the first and second mobile communication network 100, 200 together with the emulation function 500 and the emulation management function 550, providing a more detailed view, especially regarding the interfaces used. Again, the emulation function 500 comprises or is able to access or is assigned to an emulation management function 550 that is used to mapping of 5G network function profiles to exposed endpoints (i.e. to the emulation functions or emulation services 501, 502, 503, 504 in the emulation function 500) and configuration. Again, the protocol stack 100' of the first mobile communication network 100 and the protocol stack 200' of the first mobile communication network 200 is schematically indicated. In the exemplary embodiment shown in FIG. 7, the first mobile communication network 100 comprises the first network function or service 141 as the network repository function of the first mobile communication network 100, the second network function or service 142 as the unified data management function (of the first mobile communication network 100), the third network function or service 143 as the authentication server function, the fourth network function or service 144 as the session management function, the fifth network function or service 145 as the user plane function, and a sixth network function or service 146 as the policy and charging function. The emulation function 500 comprises, again, the first emulation function or emulation service 501 as a network emulation repository and discovery function, the second emulation function or emulation service 502 as an emulation subscriber and authentication function, the third emulation function or emulation service 503 as an emulation session function, and the fourth emulation function or emulation service 504 as an emulation policy function. Especially, in the exemplary embodiment shown in FIG. 7, the second, third, and fourth emulation function or emulation service 502, 503, 504 form or are able to be regarded as emulation function services (as compared to the first emulation function or emulation service 501, realizing the functionality of the network repository function regarding the emulation function 500). The second mobile communication network 200 comprises the first network element 241 as the mobility management entity (of the second mobile communication network 200), the second network element 242 as the serving gateway (SGW) function (serving gateway control plane function (SGW-C) and/or serving gateway user plane function (SGW-U)) and/or as the packet gateway control plane function (PGW-C) and/or the packet gateway user plane function (PGW-U), and the third network element 243 as the policy and charging rules function. The arrow 141' indicates network function discovery (using Nnrf API as interface). The arrow 141" indicates network function profile changes. The arrow 502' indicates an interface Nudm API. The arrows 502" indicate an interface Nausf API. The arrow 503' indicates an interface Nsmf API. The arrow 503" indicates N3 traffic. The arrow 504' indicates Npcf API. The arrow 241' indicates an S6a interface. The arrow 242' indicates a S8, S11 interface. The arrow 243' indicates a S9 interface.

Figure 7:
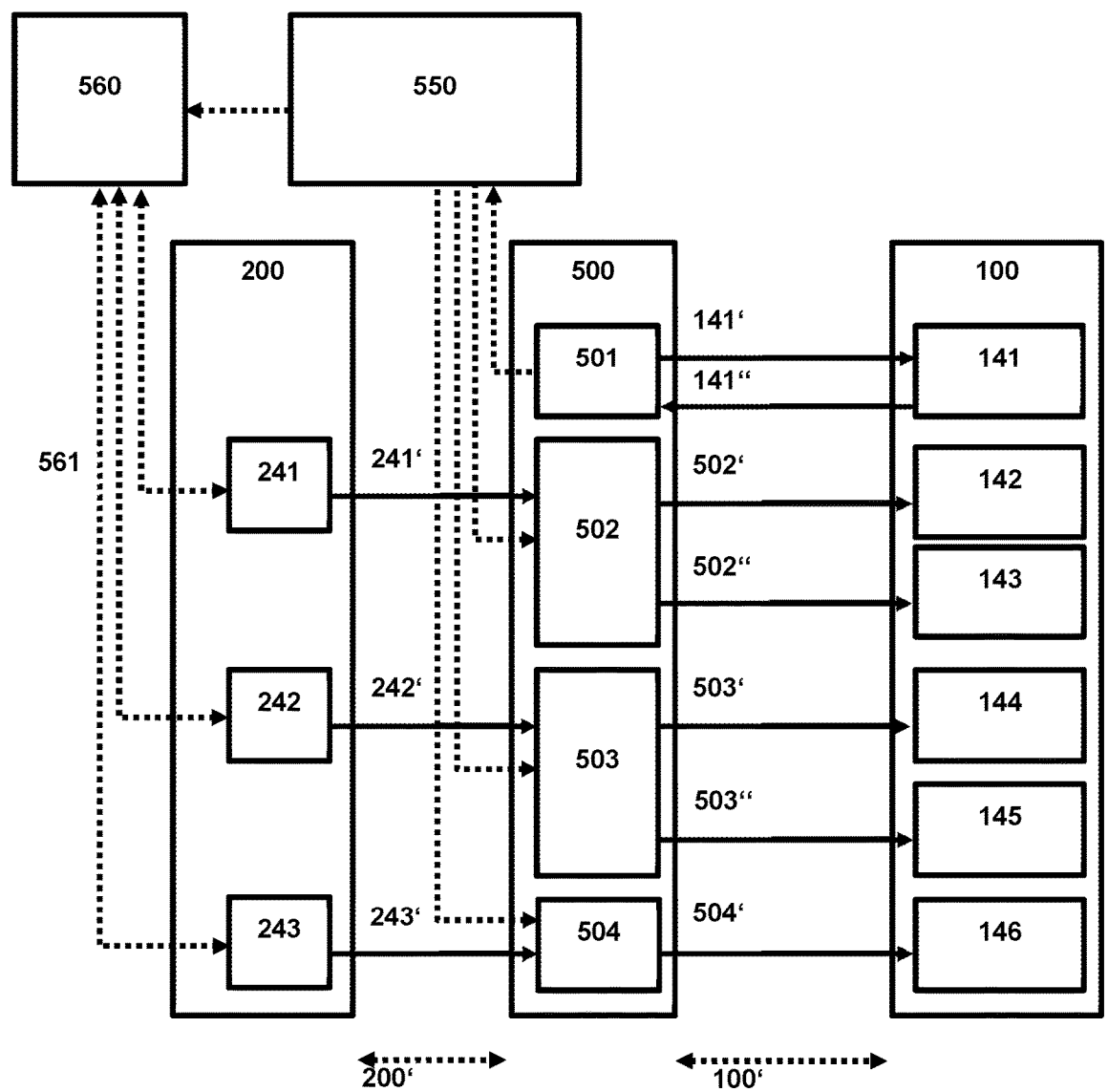

The emulation and interworking example (especially for 4G-5G interworking) shown in FIG. 7 and realized by the emulation function 50 (or by an IPX service), exposes endpoints of XG-emulation functions 502, 503, 504 impersonating the 5G network functionality (of the first mobile communication network 100) behind it. XG-emulation function endpoints are dynamically updated towards the second mobile communication network's 200 OAM system based on NF profile information from Network B's NFs obtained via the Nnrf API.

Figure 11:
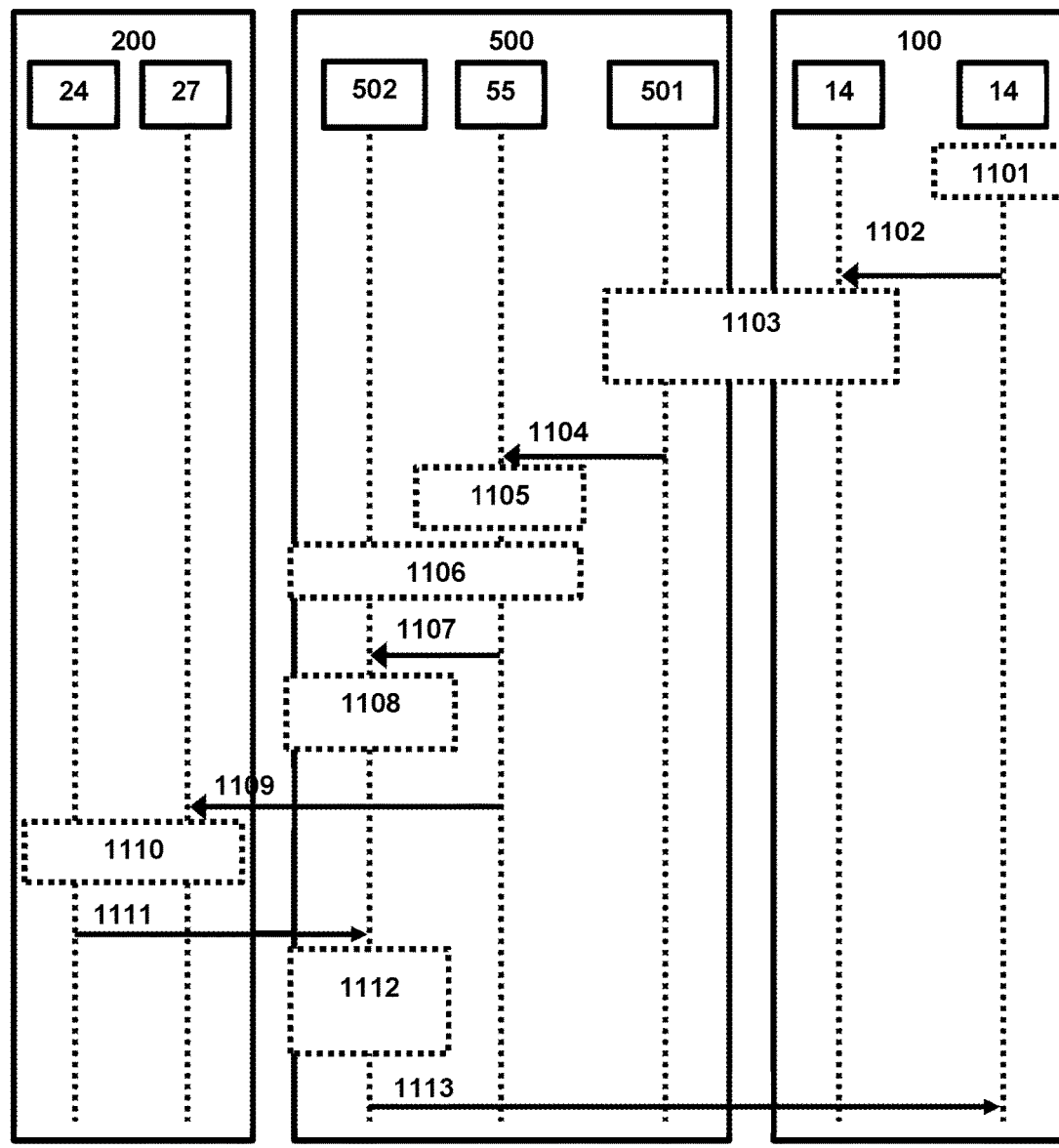
Figure 12:
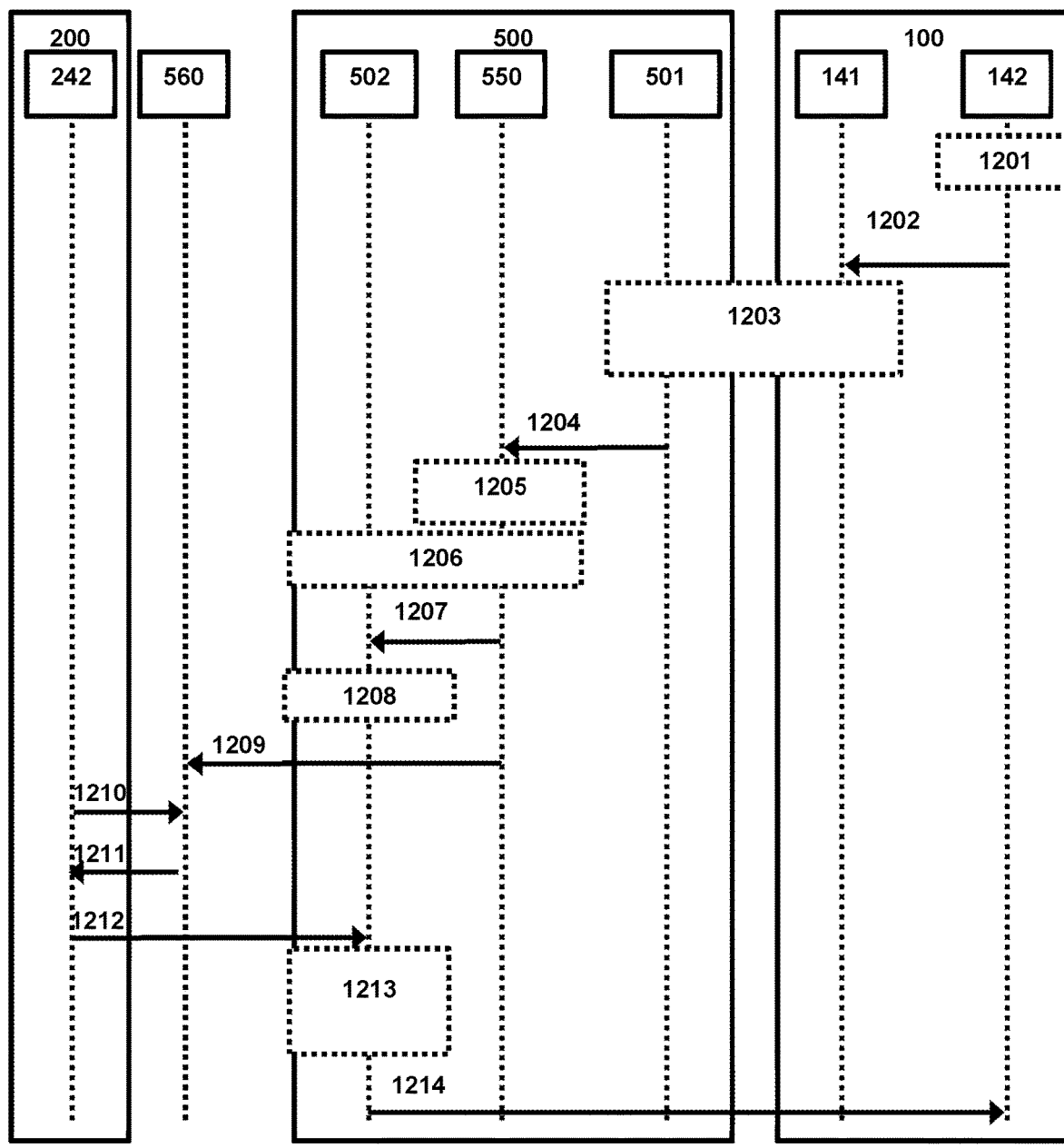

The flow diagrams of FIGS. 11 to 14 show an interworking between a 5G and a non-5G network (first and second mobile communication network 100, 200) according to the present invention. In FIGS. 11 and 12, changes within the first mobile communication network 100 are considered that need to be communicated to the second mobile communication network 200. The flow shows the interworking between a non-5G (i.e. the second mobile communication network 200) and a 5G (i.e. the first mobile communication network 100) network employing an exemplary embodiment of the inventive method in case a new network function is instantiated in the first mobile communication network 100.

Both FIGS. 11 and 12 are related to an addition of a network function (to the first mobile communication network 100) and the resulting emulation by the emulation function 500 according to the present invention. FIG. 11 describes a first alternative realization of a direct configuration of the first mobile communication network's 100 emulation addresses via the second mobile communication network's 200 operations and maintenance system. In a first processing step 1101 according to FIG. 11, the first mobile communication network's 100 new network function 142 is accessible via an endpoint Z. In a second processing step 1102 according to FIG. 11, the new network function 142 registers its network function profile in the network repository function 141 of the first mobile communication network 100, including endpoint Z, i.e. the new network function of the first mobile communication network 100 is accessible via Endpoint Z. In a third processing step 1103 according to FIG. 11, the new network function's 142 profile is available at the network repository function 501 of the emulation function 500 (i.e. at the network emulation repository and discovery function 501), typically via Nnrf query, i.e. the network repository function 501 of the emulation function 500 pulls data from the network repository function 141 of the first mobile communication network 100, or via a network function profile subscription notification (i.e. the network repository function 141 of the first mobile communication network 100 pushes data to the network emulation repository and discovery function 501). In a fourth processing step 1104 according to FIG. 11, the network function profile of the new network function 142 is notified to the emulation management function 550. In a fifth processing step 1105 according to FIG. 11, the network function profile of the new network function 142 is mapped to the emulation function configuration. In a sixth processing step 1106 according to FIG. 11, a new emulation function 502, i.e. a 4G emulation function or emulation service 502 is instantiated. This step is only performed if required, i.e. this step is optional. In a seventh processing step 1107 according to FIG. 11, the new emulation function 502, i.e. a 4G emulation function or emulation service 502, is configured to emulate the new network function 142 in the first mobile communication network 100, and to map between endpoint Y and endpoint Z. In an eighth processing step 1108 according to FIG. 11, the 4G emulation function or emulation service 502 accessible via endpoint Y emulates the new network function 142 as an emulated network element (such as emulated network elements 521, 522, 523, 524, cf. FIG. 2). In a ninth processing step 1109 according to FIG. 11, the second mobile communication network 200 is notified—especially its operations and maintenance 270—of the new accessible network element (i.e. the 4G emulation function or emulation service 502, or the emulated network element). In a tenth processing step 1110 according to FIG. 11, the corresponding network element 242 of the second mobile communication network 200 is aware of endpoint Y of the 4G emulation function or emulation service 502 as an emulation of a corresponding network element within the first mobile communication network 100, i.e. impersonating the 5G network functionality (of the second mobile communication network 200) behind it. In an eleventh processing step 1111 according to FIG. 11, a request to endpoint Y (according to the protocol stack of the second mobile communication network 200). In a twelfth processing step 1112 according to FIG. 11, the 4G emulation function or emulation service 502 performs protocol translation/adaptation and/or procedure adaptation. In a thirteenth processing step 1113 according to FIG. 11, the request (initiated in the eleventh processing step 1111) for network function 142 (of the first mobile communication network 100) is directed to endpoint Z (using the SBI protocol stack of the first mobile communication network 100).

FIG. 12 describes another alternative realization of a direct configuration of the first mobile communication network's 100 emulation addresses via using the DNS system 560, i.e. in case network address resolving is done as specified in GSMA's IR.67, the network elements of the second mobile communication network 200 are not reconfigured, but rather the DNS server 560 resolving addresses for the second mobile communication network 200. The first to eight processing steps 1201 to 1208 according to FIG. 12 are identical to the first eight processing steps 1101 to 1108 according to FIG. 11. In a ninth processing step 1209 according to FIG. 12, the DNS system 560 is configured to map the address of network element 242 of the second mobile communication network 200 to the endpoint of the corresponding 4G emulation function or emulation service 502. In a tenth processing step 1210 according to FIG. 12, the network element 242 of the second mobile communication network 200 queries the DNS system 560 to resolve the network address of the corresponding network element of the first mobile communication network 100 (e.g. network-100.mnc999.mcc99.gprs) to an address. In an eleventh processing step 1211 according to FIG. 12, the DNS system 560 responds with Endpoint Y (e.g. IP address). In a twelfth processing step 1212 according to FIG. 12, the network element 242 of the second mobile communication network 200 transmits a request to endpoint Y (i.e. using the protocol stack of the second mobile communication network 200). In a thirteenth processing step 1213 according to FIG. 12, the 4G emulation function or emulation service 502 performs protocol translation/adaptation and/or procedure adaptation. In a fourteenth processing step 1214 according to FIG. 12, the 4G emulation function or emulation service 502 transmits a request directed to Endpoint Z for the network function 142 of the first mobile communication network 100 (using the SBI protocol stack).

Figure 13:
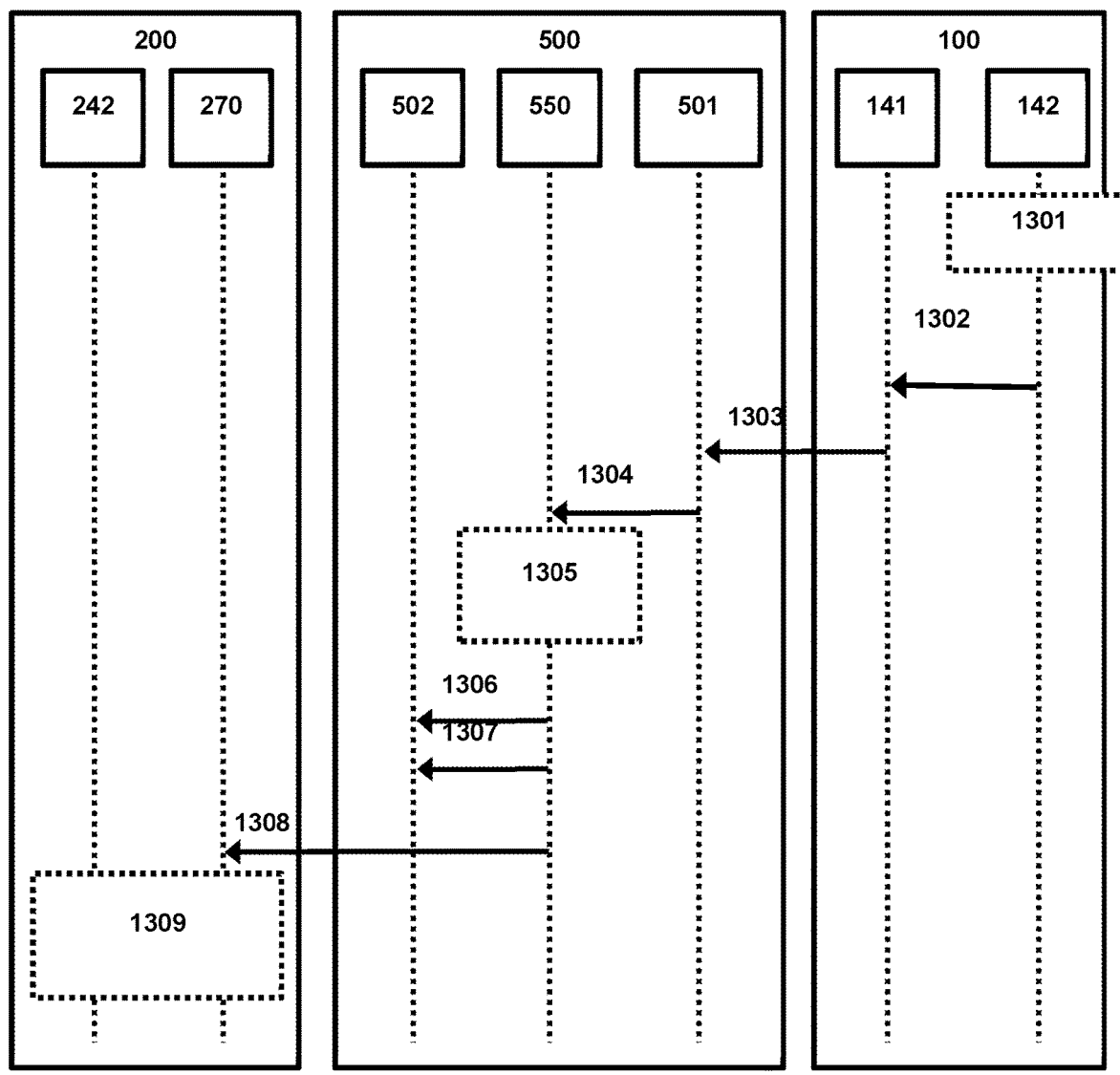
Figure 14:
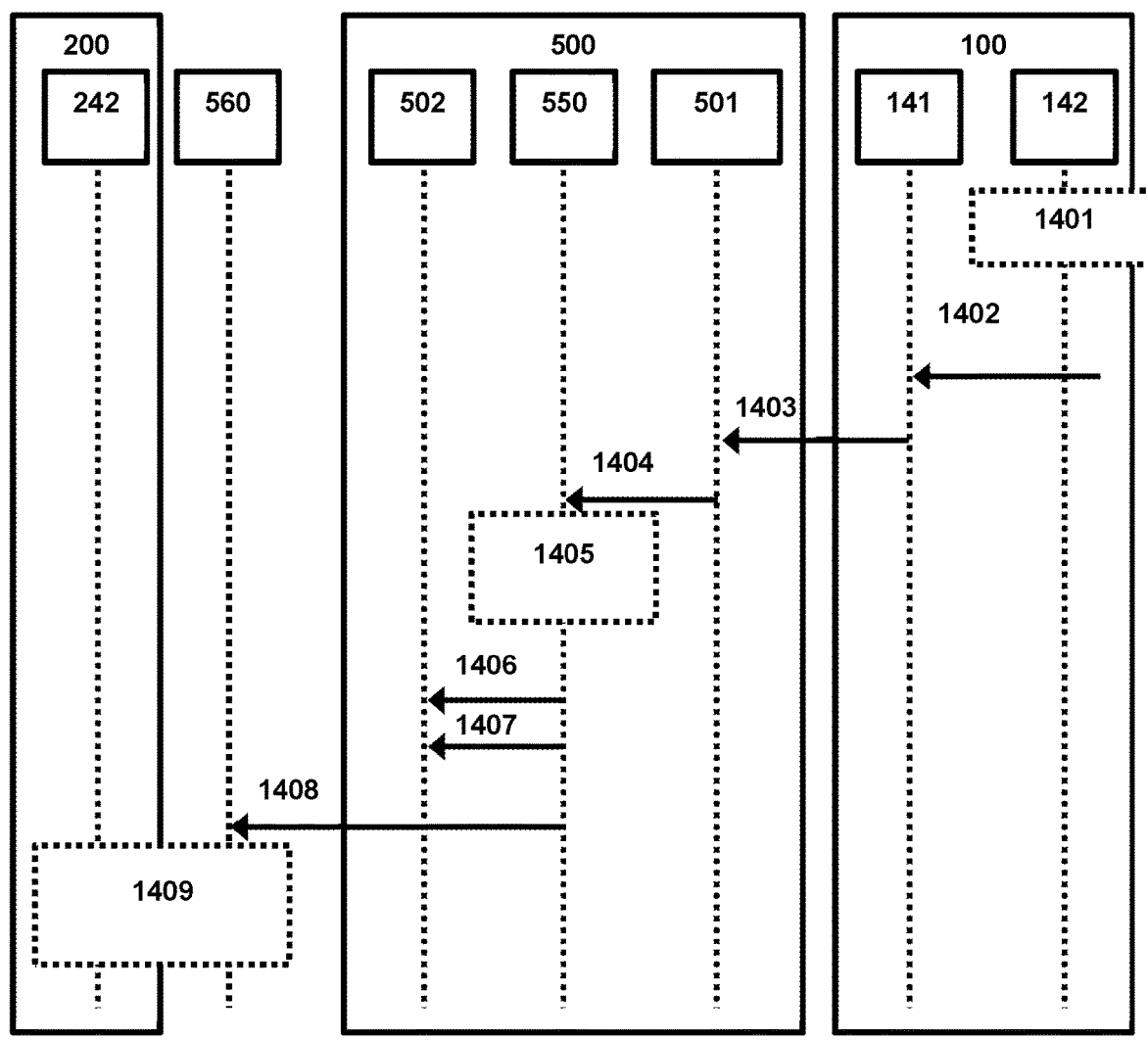

Both FIGS. 13 and 14 are related to the modification/removal of a network function within the first mobile communication network 100. FIG. 13 relates to the modification/removal of a network function with direct configuration of the emulation address of the first mobile communication network 100 via the second mobile communication network's OAM system. FIG. 14 relates to the modification/removal of a network function via DNS system.

In a first processing step 1301 according to FIG. 13, the first mobile communication network's 100 network function 142 is accessible via an endpoint Z. In a second processing step 1302 according to FIG. 13, the network function 142 deregisters/updates its network function profile in the network repository function 141 of the first mobile communication network 100. In a third processing step 1303 according to FIG. 13, the change (modification, deregistration) in the network function profile of the first mobile communication network's 100 network function 142 is notified at the network repository function 501 of the emulation function 500 (i.e. at the network emulation repository and discovery function 501). In a fourth processing step 1304 according to FIG. 13, the network function profile change is notified to the emulation management function 550. In a fifth processing step 1305 according to FIG. 13, the modified network function profile of new network function 142 is mapped to the emulation function configuration. In a sixth processing step 1306 according to FIG. 13, emulation function 502, i.e. a 4G emulation function or emulation service 502 is changed to reflect the changes in the network function (profile) of the first mobile communication network's 100 network function 142. This step is only performed in case of a change of the 4G emulation function or emulation service 502; in case of removal of the 4G emulation function or emulation service 502 (typically in case that network function 142 in the first mobile communication network 100 deregisters), alternatively to the sixth step a seventh processing step 1307 according to FIG. 13 is performed, during which emulation function 502 (4G emulation function or emulation service 502) is removed. In an eighth processing step 1308 according to FIG. 13, the second mobile communication network 200 is notified—especially its operations and maintenance 270—of the change or the removal of the first mobile communication network's 100 network element (i.e. the change or removal of the 4G emulation function or emulation service 502). In a ninth processing step 1309 according to FIG. 13, the corresponding network element 242 of the second mobile communication network 200 is reconfigured with the new configuration and has updated corresponding information regarding the modified/deregistered corresponding network element within the first mobile communication network 100.

FIG. 14 shows another alternative realization of a direct configuration of the first mobile communication network's 100 emulation addresses via using the DNS system 560, i.e. in case network address resolving is done as specified in GSMA's IR.67, the network elements of the second mobile communication network 200 are not reconfigured, but rather the DNS server 560 resolving addresses for the second mobile communication network 200. The first seven processing steps 1401 to 1407 according to FIG. 14 are identical to the first seven processing steps 1301 to 1307 according to FIG. 13. In an eighth processing step 1408 according to FIG. 14, the DNS system 560 is reconfigured to reflect in the second mobile communication network 200 the modifications (changes/removal) of the corresponding 4G emulation function or emulation service 502. In a ninth processing step 1409 according to FIG. 14, the network element 242 of the second mobile communication network 200 queries the DNS system 560 to resolve that address will return an updated DNS entry.

Hence, according to the present invention, a non-5G (e.g. 4G) network emulation and interworking service with 5G networks is realized comprising a non-5G (e.g. 4G) Network Emulation Repository and Discovery Function (XG-NERD-F) functionality, an emulation management function (EMF, 550), and one or more non-5G emulation functions (XG-EFs, 501, 502, . . . /521, 522, . . . ), the service linking at least one non-5G (e.g. 4G) mobile communication network having network elements (such as the second mobile communication network 200) and at least one 5G mobile communication network having network function or services (such as the first mobile communication network 100). Thereby, emulation of the 5G network as a non-5G network (e.g. 4G) and interworking with 5G networks is realized via automatic configuration of the endpoints and/or configuration of the emulated network elements towards the non-5G network(s) based on network function profile information of the 5G network resulting in the XG-EFs being known to non-5G NEs and being accessed as non-5G NEs.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for an emulation functionality between a first mobile communication network and a second mobile communication network, wherein the first mobile communication network is a mobile communication network realizing dynamic deployment or configuration of a plurality of network functions or services such that the plurality of network functions or services composing the first mobile communication network discover interconnection endpoints via which communication with other network functions or services in the first mobile communication network or another network is able to be realized via querying a network function registry, and wherein the second mobile communication network is a mobile communication network comprising a plurality of network elements, wherein the plurality of network elements composing the second mobile communication network are configured with interconnection endpoints via which communication with other network elements in the second mobile communication network or another network is able to be realized,
wherein the emulation functionality is realized via providing an emulation function comprising a first interface towards the first mobile communication network and a second interface towards the second mobile communication network, wherein the first interface comprises a plurality of emulated network functions or services corresponding to or interacting with the plurality of network functions or services, and wherein the second interface comprises a plurality of emulated network elements corresponding to or interacting with the plurality of network elements, wherein the method comprises:
implementing, by the emulation function and the first and second interfaces of the emulation function using the plurality of emulated network functions or services and the plurality of emulated network elements, an exchange of messages between the first and second mobile communication networks, thereby mapping between equivalent capabilities or needs of respective network functions or services and respective network elements and providing for:
implementation of first individual interfaces or first individual interface types between network functions or services and respective corresponding emulated network functions or services as application programming interfaces (APIs); and
implementation of second individual interfaces or second individual interface types between network elements and respective corresponding emulated network elements as network standard-specific interfaces or protocols.

2. The method according to claim 1, wherein the emulation function provides for a protocol translation, a protocol adaptation, a parameter mapping and a procedure adaptation, thereby mapping between equivalent capabilities of the first and second mobile communication networks; and
wherein an internal message procedure state is realized by the emulation function, thereby multiplexing or demultiplexing messages between the first and second mobile communication networks, wherein a different behavior regarding keep-alive messages is applied to the first mobile communication network versus the second mobile communication network.

3. The method according to claim 1, wherein the plurality of network functions or services comprise at least the following:
a network repository function (NRF),
an access and mobility management function (AMF),
a session management function (SMF),
an authentication server function (AUSF),
a user plane function (UPF),
a unified data management function (UDM), and
a policy and charging function (PCF);
wherein the plurality of emulated network functions or services of the first interface of the emulation function comprise emulated network functions or services corresponding to the network functions or services, wherein an appropriate one of the first individual interfaces or first individual interface types is provided or implemented between each one of the plurality of network functions or services and a respective corresponding emulated network function or service of the plurality of emulated network functions or services;
wherein the plurality of network elements comprise at least the following:
a home subscriber server (HSS),
a mobility management entity (MME),
a packet gateway control plane function (PGW-C),
a packet gateway user plane function (PGW-U),
a serving gateway control plane function (SGW-C),
a serving gateway user plane function (SGW-U), and
a policy and charging rules function (PCRF); and
wherein the plurality of emulated network elements of the second interface of the emulation function comprise emulated network elements corresponding to the network elements, wherein a respective one of the second individual interfaces or second individual interface types is provided or implemented between each one of the plurality of network elements and a respective corresponding emulated network element of the plurality of emulated network elements.

4. The method according to claim 1, wherein the emulation function comprises a plurality of emulation functions or emulation services, wherein each one of the emulation functions or emulation services comprises at least one of the emulated network functions or services and one of the emulated network elements.

5. The method according to claim 1, wherein the emulation function comprises an emulation repository and discovery function that is seen by the first mobile communication network as a network repository function.

6. The method according to claim 1, wherein the emulation function is part of an IP exchange services (IPX) system providing the possibility to link the first mobile communication network and the second mobile communication network.

7. The method according to claim 1, wherein the method further comprises:
transmitting a specific modification within one of the first and second mobile communication networks regarding the plurality of network functions or services or the plurality of network elements to the emulation function; and
translating the specific modification to or into a corresponding specific modification of the first or second interfaces of the emulation function, wherein the corresponding specific modification corresponds to:
a modification of the plurality of emulated network elements of the second interface of the emulation function in case the specific modification corresponds to a modification of the plurality of network functions or services of the first mobile communication network, and
a modification of the plurality of emulated network functions or services of the first interface of the emulation function in case the specific modification corresponds to a modification of the plurality of network elements of the second mobile communication network;
wherein the modification of the plurality of emulated network elements of the second interface or the modification of the plurality of network elements of the second mobile communication network corresponds to a reconfiguration of the second mobile communication network; and
wherein the modification of the plurality of emulated network functions or services of the first interface or the modification of the plurality of network functions or services of the first mobile communication network corresponds to a network functions profile modification.

8. The method according to claim 7, wherein the method further comprises:
after translating the specific modification, operatively applying, by the first and second mobile communication networks, the specific modification.

9. A system for an emulation functionality between a first mobile communication network and a second mobile communication network, the system comprising:
the first mobile communication network;
the second mobile communication network; and
an emulation function;
wherein the first mobile communication network is a mobile communication network realizing dynamic deployment or configuration of a plurality of network functions or services such that the plurality of network functions or services composing the first mobile communication network discover interconnection endpoints via which communication with other network functions or services in the first mobile communication network or another network is able to be realized via querying a network function registry;
wherein the second mobile communication network is a mobile communication network comprising a plurality of network elements, wherein the plurality of network elements composing the second mobile communication network are configured with interconnection endpoints via which communication with other network elements in the second mobile communication network or another network is able to be realized;
wherein the emulation functionality is realized via providing the emulation function;
wherein the emulation function comprises a first interface towards the first mobile communication network, and a second interface towards the second mobile communication network;
wherein the first interface comprises a plurality of emulated network functions or services corresponding to or interacting with the plurality of network functions or services;
wherein the second interface comprises a plurality of emulated network elements corresponding to or interacting with the plurality of network elements;
wherein the emulation function and the first and second interfaces of the emulation function are configured to implement, using the plurality of emulated network functions or services and the plurality of emulated network elements, an exchange of messages between the first and second mobile communication networks, thereby mapping between equivalent capabilities or needs of respective network functions or services and respective network elements and providing for:
implementation of first individual interfaces or first individual interface types between the network functions or services and respective corresponding emulated network functions or services as application programming interfaces (APIs), and
implementation of second individual interfaces or second individual interface types between the network elements and respective corresponding emulated network elements as network standard-specific interfaces or protocols.

10. A non-transitory computer-readable medium having processor-executable instructions stored thereon for an emulation functionality between a first mobile communication network and a second mobile communication network, wherein the first mobile communication network is a mobile communication network realizing dynamic deployment or configuration of a plurality of network functions or services such that the plurality of network functions or services composing the first mobile communication network discover interconnection endpoints via which communication with other network functions or services in the first mobile communication network or another network is able to be realized via querying a network function registry, and wherein the second mobile communication network is a mobile communication network comprising a plurality of network elements, wherein the plurality of network elements composing the second mobile communication network are configured with interconnection endpoints via which communication with other network elements in the second mobile communication network or another network is able to be realized,
wherein the emulation functionality is realized via providing an emulation function comprising a first interface towards the first mobile communication network and a second interface towards the second mobile communication network, wherein the first interface comprises a plurality of emulated network functions or services corresponding to or interacting with the plurality of network functions or services, and wherein the second interface comprises a plurality of emulated network elements corresponding to or interacting with the plurality of network elements, wherein the processor-executable instructions, when executed, facilitate:

implementing, by the emulation function and the first and second interfaces of the emulation function using the plurality of emulated network functions or services and the plurality of emulated network elements, an exchange of messages between the first and second mobile communication networks, thereby mapping between equivalent capabilities or needs of respective network functions or services and respective network elements and providing for:

implementation of first individual interfaces or first individual interface types between network functions or services and respective corresponding emulated network functions or services as application programming interfaces (APIs); and implementation of second individual interfaces or second individual interface types between the network elements and respective corresponding emulated network elements as network standard-specific interfaces or protocols.

\* \* \* \* \*